(12) United States Patent
Racho et al.

(10) Patent No.: US 12,322,945 B2
(45) Date of Patent: Jun. 3, 2025

(54) CABLE RETAINER AND METHOD

(71) Applicant: Lear Corporation, Southfield, MI (US)

(72) Inventors: Edgar Michael Racho, Lapu-Lapu City (PH); Alexzyev Dolumbal, Lapu-Lapu City (PH); William Bond, Livonia, MI (US); John Montgomery, Canton, MI (US); Jun Roz Ruayana, Novi, MI (US); Erwin Baga-an, Cebu City (PH); Albert M. Cabañero, Cebu City (PH)

(73) Assignee: Lear Corporation, Southfield, MI (US)

( * ) Notice: Subject to any disclaimer, the term of this patent is extended or adjusted under 35 U.S.C. 154(b) by 36 days.

(21) Appl. No.: 17/741,981

(22) Filed: May 11, 2022

(65) Prior Publication Data
US 2023/0369840 A1    Nov. 16, 2023

(51) Int. Cl.
*H02G 3/32*    (2006.01)
*F16L 3/00*    (2006.01)
*B60R 16/02*    (2006.01)

(52) U.S. Cl.
CPC .................. *H02G 3/32* (2013.01); *F16L 3/00* (2013.01); *B60R 16/0215* (2013.01)

(58) Field of Classification Search
CPC ......... H02G 3/32; F16L 3/00; B60R 16/0215; F16B 21/084; F16B 21/082; Y10T 24/44026; Y10T 24/303; Y10T 24/309
USPC ...... 248/71; 411/510, 913, 338, 339; 24/297
See application file for complete search history.

(56) References Cited

U.S. PATENT DOCUMENTS

| | | | |
|---|---|---|---|
| 3,252,677 A * | 5/1966 | Achille | F16L 3/227 411/510 |
| 4,918,261 A * | 4/1990 | Takahashi | F16L 3/23 174/72 A |
| 5,689,863 A | 11/1997 | Sinozaki | |
| 5,806,812 A | 9/1998 | Jacobs et al. | |
| 5,929,382 A | 7/1999 | Moore et al. | |
| 5,932,846 A | 8/1999 | Zaguskin et al. | |
| 6,464,181 B2 * | 10/2002 | Sakakura | F16L 3/23 248/68.1 |
| 6,561,465 B2 * | 5/2003 | Kondo | F16L 3/1025 248/74.1 |

(Continued)

FOREIGN PATENT DOCUMENTS

| | | |
|---|---|---|
| DE | 10315316 A1 | 10/2004 |
| DE | 202015003578 U1 | 5/2016 |

(Continued)

*Primary Examiner* — Kimberly T Wood
(74) *Attorney, Agent, or Firm* — Fishman Stewart PLLC

(57) ABSTRACT

A cable retainer for connecting a flat cable to an external object may include a base and/or a locking member. The base may include a platform, a securing protrusion, and/or a fastener. The securing protrusion may extend from the platform in a first direction and the fastener may extend from the platform in a second direction opposite the first direction. The fastener may be configured for connection with said external object. The locking member may include an interior surface defining a hole and an internal connection formation extending from at least a portion of the interior surface. In an assembled configuration, the locking member may be connected to the base, and the cable retainer may be configured to secure a portion of said flat cable between the platform of the base and the locking member.

12 Claims, 25 Drawing Sheets

(56) References Cited

U.S. PATENT DOCUMENTS

| | | | |
|---|---|---|---|
| 6,572,317 B2 | 6/2003 | Okada et al. | |
| 6,620,105 B2* | 9/2003 | Sharpe | A61B 5/303 385/139 |
| 6,669,426 B1 | 12/2003 | Detter et al. | |
| 7,301,101 B2* | 11/2007 | Suzuki | B60R 16/0215 174/72 A |
| 7,377,472 B2* | 5/2008 | Brown | F16L 3/10 24/271 |
| D589,333 S | 3/2009 | Nakazato | |
| 7,753,634 B2 | 7/2010 | Nakazato | |
| 7,927,050 B2 | 4/2011 | Koike | |
| 8,028,962 B2 | 10/2011 | Geiger | |
| 8,177,173 B2* | 5/2012 | Spiess | F16L 3/04 248/74.1 |
| 8,393,058 B2 | 3/2013 | Okada et al. | |
| 8,495,802 B2 | 7/2013 | Okada et al. | |
| 8,511,631 B2 | 8/2013 | Kato et al. | |
| 8,533,919 B2* | 9/2013 | Schliessner | F16B 5/0685 24/297 |
| 8,591,160 B2 | 11/2013 | Shinozaki | |
| 8,636,454 B2 | 1/2014 | Okada et al. | |
| D779,314 S | 2/2017 | Adams | |
| 9,951,889 B2* | 4/2018 | Reed | F16B 13/061 |
| 9,982,700 B2 | 5/2018 | Najima | |
| D822,476 S | 7/2018 | Haftarski et al. | |
| D840,799 S | 2/2019 | Haftarski et al. | |
| D889,253 S | 7/2020 | Makino et al. | |
| 2001/0010349 A1 | 8/2001 | Sakakura | |
| 2012/0217355 A1* | 8/2012 | Geiger | F16L 3/2332 248/65 |
| 2019/0331258 A1 | 10/2019 | Geiger et al. | |

FOREIGN PATENT DOCUMENTS

| | | |
|---|---|---|
| JP | S63240307 A | 10/1988 |
| JP | H07274357 A | 10/1995 |
| JP | 2004104964 A | 4/2004 |
| KR | 200478422 Y1 | 10/2015 |

\* cited by examiner

CABLE RETAINER AND METHOD

TECHNICAL FIELD

The present disclosure generally relates to cable retainers for connecting flat cables to external objects, such as cable retainers that may, for example, be utilized in connection with and/or incorporated into vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some cable retainers may not provide sufficient functionality. Some cable retainers may not be configured to connect flat cables to external objects, may be expensive, and/or may be difficult to assemble.

There is a desire for solutions/options that minimize or eliminate one or more challenges or shortcomings of cable retainers. The foregoing discussion is intended only to illustrate examples of the present field and is not a disavowal of scope.

SUMMARY

In embodiments, a cable retainer for connecting a flat cable to an external object may include a base and/or a locking member. The base may include a platform, a securing protrusion, and/or a fastener. The securing protrusion may extend from the platform in a first direction and the fastener may extend from the platform in a second direction opposite the first direction. The fastener may be configured for connection with said external object. The locking member may include an interior surface defining a hole and an internal connection formation extending from at least a portion of the interior surface. In an assembled configuration, a part of the securing protrusion of the base may be disposed within the hole of the locking member and may be in contact with the internal connection formation of the locking member such that the locking member is connected to the base, and the cable retainer may be configured to secure a portion of said flat cable between the platform of the base and the locking member.

With embodiments, a method of connecting a cable retainer may include forming an opening into the flat cable, the opening having an opening length that is greater than a length of the securing protrusion of the base, inserting the securing protrusion of the base into the opening such that the flat cable is disposed on the platform, connecting the locking member to the base, and/or connecting a fastener of the base to an external object such the flat cable is connected to the external object via the cable retainer.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
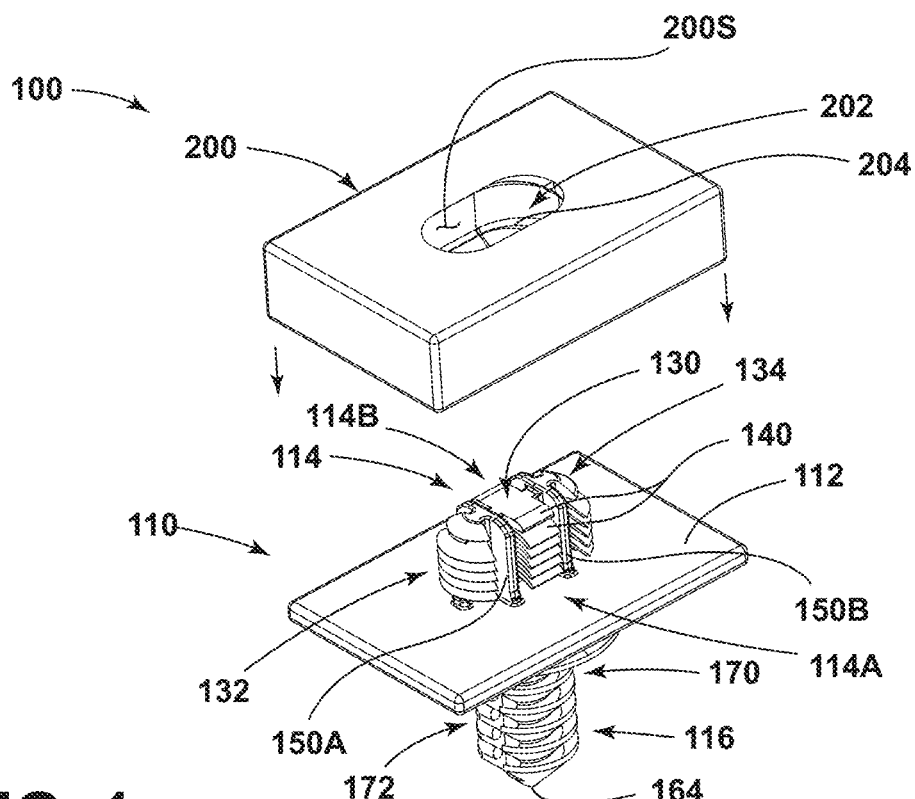
FIG. 1 is an exploded perspective view generally illustrating an embodiment of a cable retainer according to teachings of the present disclosure.
Figure 2:
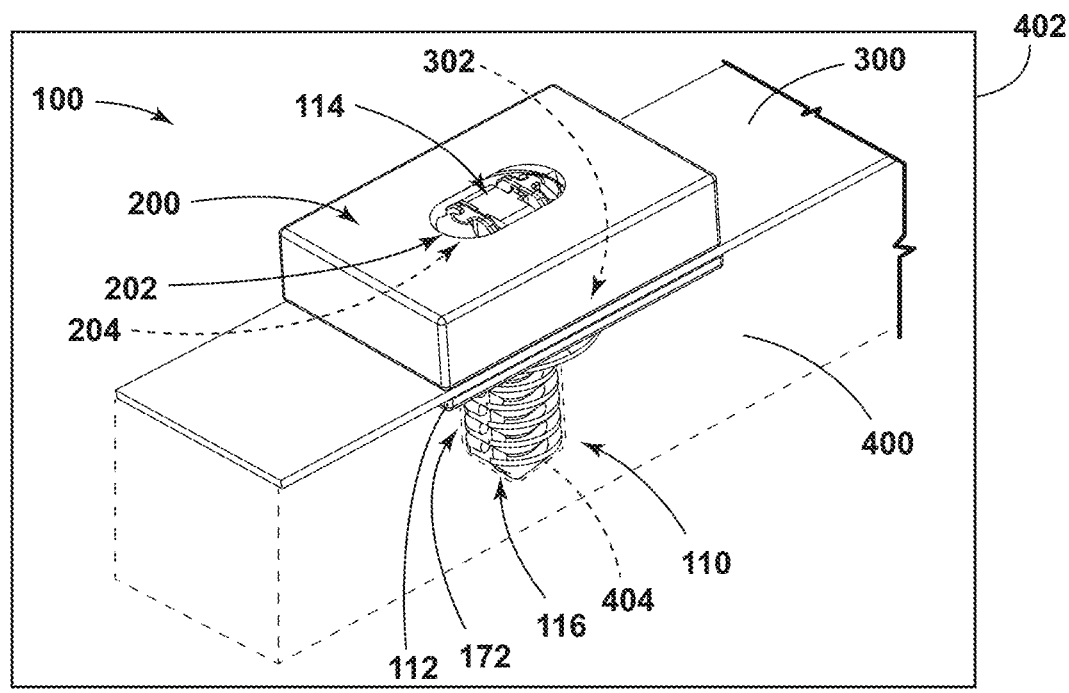
FIG. 2 is a partial perspective view generally illustrating an embodiment of a cable retainer connected to a flat cable and an external object according to teachings of the present disclosure.

In embodiments, such as generally illustrated in FIGS. 1 and 2, a cable retainer 100 may include a base 110 and/or a locking member 200. The cable retainer 100 may be configured to connect a flat cable 300 (e.g., a flat flexible cable) to an external object 400 (see, e.g., FIG. 2). The external object 400 may, for example and without limitation, include a surface, a portion, and/or a component of a vehicle 402, such as vehicle floor, a vehicle ceiling, and/or a vehicle panel, and/or may include a non-vehicle component, among others.

Figure 3:
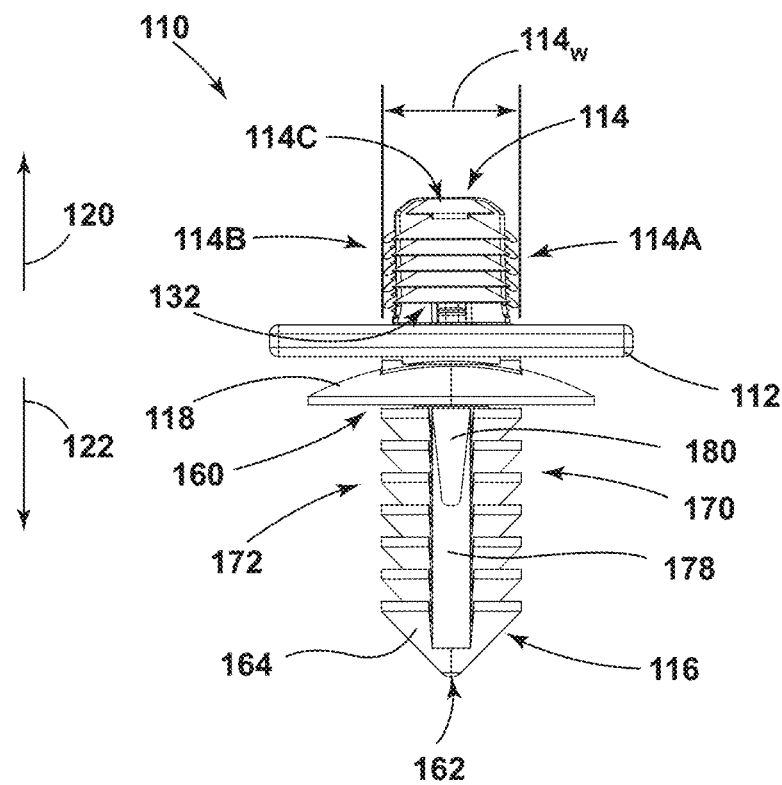
FIG. 3 is a side view generally illustrating an embodiment of a base of a cable retainer according to teachings of the present disclosure.
Figure 4:
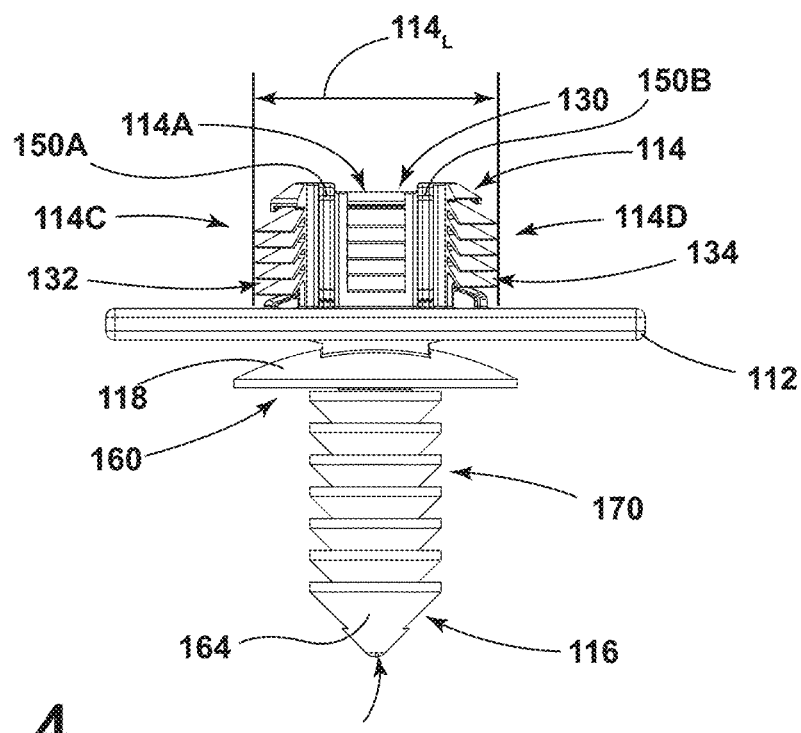
FIG. 4 is a front view generally illustrating an embodiment of a base of a cable retainer according to teachings of the present disclosure.

With embodiments, such as generally illustrated in FIGS. 3 and 4, a base 110 may include a platform 112, a securing protrusion 114, a fastener 116, and/or a flange 118. In some example configurations, the securing protrusion 114 may extend from the platform 112 in a first direction 120 and/or the fastener 116 may extend from the platform 112 in a second direction 122. In some instances, the second direction 122 may be opposite the first direction 120. The flange 118 may include a conical configuration.

Figure 5:
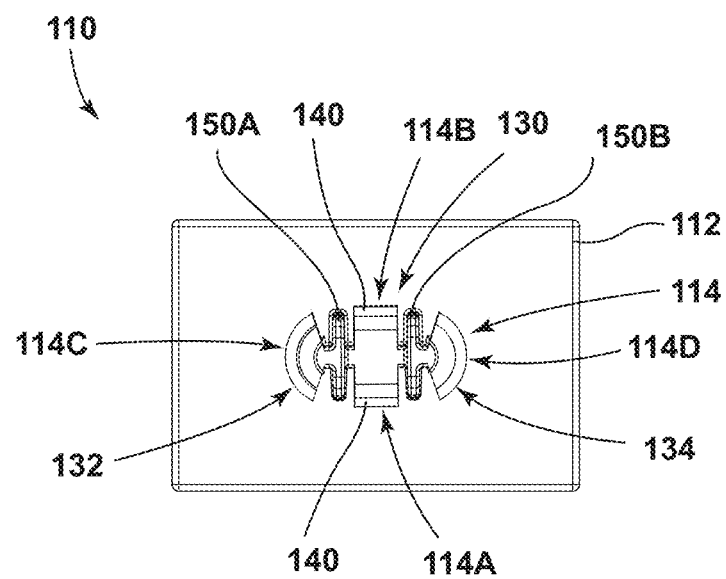
FIG. 5 is a top view generally illustrating an embodiment of a base of a cable retainer according to teachings of the present disclosure.

In embodiments, such as generally illustrated in FIGS. 3-5, a securing protrusion 114 of a base 110 may include a first side 114A, a second side 114B that may be spaced apart from the first side 114A, a third side 114C disposed between the first and second sides 114A, 114B, and/or a fourth side 114D that may be spaced apart from the third side 114C (see, e.g., FIG. 5). In some example configurations, the securing protrusion 114 may include a plurality of first projections 130, a plurality of second projections 132, and/or a plurality of third projections 134. The first projections 130 may extend from the first side 114A and/or the second side 114B of the securing protrusion 114. The second projections 132 may extend from the third side 114C of the securing protrusion 114 and/or the third projections 134 may extend from the fourth side 114D of the securing protrusion 114. The first projections 130, the second projections 132, and/or the third projections 134 may be configured to engage portions of the locking member 200 such as to connect the locking member 200 with the base 110.

With embodiments, at least one of the first projections 130 may include a substantially polygonal (e.g., rectangular) shape, a curved shape, and/or a tapered end 140 (see, e.g., FIGS. 1 and 5). In some example configurations, at least one of the second projections 132 and/or at least one of the third projections 134 may include a partial conical shape that may flare outward toward the platform 112. The first projections 130 may be spaced apart relative to one another along the first side 114A and the second side 114B, the second projections 132 may be spaced apart relative to one another along the third side 114C, and/or the third projections 134 may be spaced apart relative to one another along the fourth side 114D. In some configurations, the first projections 130, the second projections 132, and/or the third projections 134 may, for example and without limitation, each include six projections. In some examples, the first projections 130, the second projections 132, and/or the third projections 134 may include more or less than six projections, and may include the same or different numbers of projections.

In embodiments, a securing protrusion 114 of the base 110 may include a first track 150A and/or a second track 150B. In some instances, the first track 150A may be disposed between the first projections 130 and the second projections 132. The second track 150B may be disposed between the first projections 130 and the third projections 134.

With embodiments, a fastener 116 of a base 110 may include a first end 160 disposed proximate a platform 112 of the base 110 and/or a second end 162 that may be spaced apart from the first end 160 (see, e.g., FIGS. 3 and 4). The fastener 116 may include a cone portion 164, a plurality of first engagement projections 170, and/or a plurality of second engagement projections 172. The cone portion 164 may be disposed proximate the second end 162. In some example configurations, the first engagement projections 170, and/or the second engagement projections 172 may be disposed between the cone portion 164 and the flange 118.

In embodiments, the first engagement projections 170 may be separated from the second engagement projections 172 (e.g., in a circumferential direction) by one or more voids 178. A void 178 may extend from the first end 160 toward or to the second end 162 of the fastener 116. An attachment segment 180 may be disposed within a void 178 and may extend from the first end 160 and may terminate before reaching the second end 162 of the fastener 116 (see, e.g., FIG. 3).

With embodiments, the first engagement projections 170 and/or the second engagement projections 172 may be configured to engage portions of an external object 400 such as to connect (e.g., fasten) the cable retainer 100 to the external object 400. The first engagement projections 170 and the second engagement projections 172 may, for example and without limitation, each include six projections. In some examples, the first engagement projections 170 and/or the second engagement projections 172 may include more or less than six projections. In some example configurations, the first and second engagement projections 170, 172 may cooperate to define substantially conical shapes.

In embodiments, such as generally illustrated in FIGS. 1, 2, 6A, and 6B, a locking member 200 may include an interior surface 200S that may define a hole 202 (e.g., a through hole) and/or an internal connection formation 204. The locking member 200 may be configured to connect with the securing protrusion of the base 110. In some examples, the locking member 200 may be formed separately (e.g., as an independent component) from the base 110. For example and without limitation, a base 110 and a locking member 200 may each be single, unitary, monolithic components that are formed separately from each other.

Figure 6A:
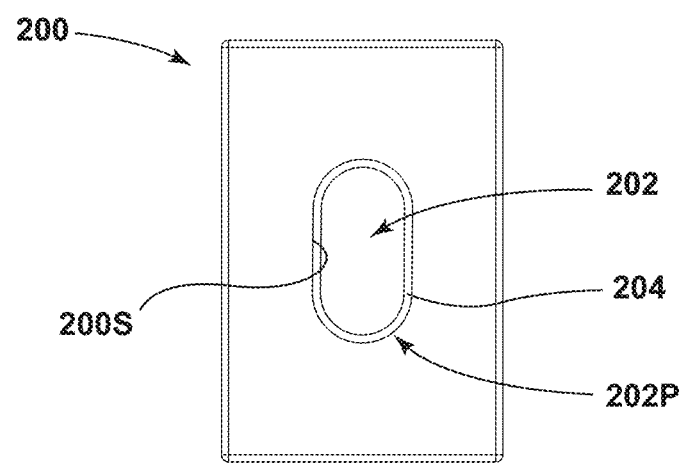
FIG. 6A is a top view generally illustrating an embodiment of a locking member of a cable retainer according to teachings of the present disclosure.
Figure 6B:
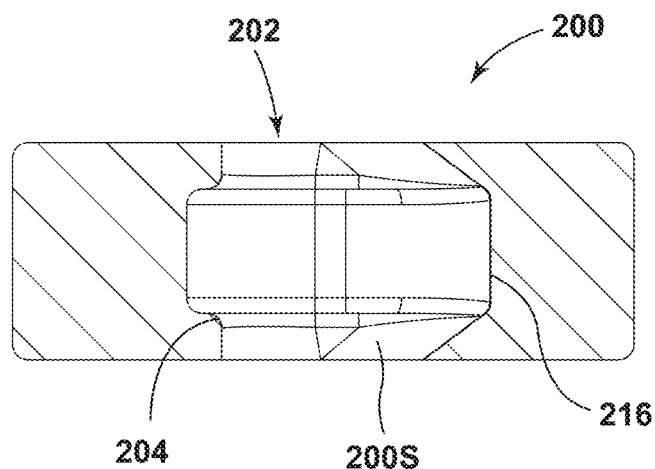
FIG. 6B is a cross-sectional view generally illustrating an embodiment of a locking member of a cable retainer according to teachings of the present disclosure.

With embodiments, the internal connection formation 204 may be disposed within a hole 202 of the locking member 200. The internal connection formation 204 may be configured to connect with a portion of the securing protrusion 114 of a base 110. For example and without limitation, the internal connection formation 204 may include a ridge, a rim, and/or a lip, among other formations. In some example configurations, the internal connection formation 204 may extend from and/or form a portion of the interior surface 200S of the locking member 200. For example and without limitation, the internal connection formation 204 may include a portion of the hole 202 with one or more reduced dimensions (e.g., width, length, radius, etc.) compared to at least some other portions. The internal connection formation 204 may extend along at least a portion of a perimeter 202P of the hole 202. In some instances, the internal connection formation 204 may extend continuously and/or uninterrupted along the entire perimeter 202P (see, e.g., FIG. 6A). A locking member 200 may include an internal recess 216, such as generally illustrated in FIG. 6B. The recess 216 may be defined in part by the internal connection formation 204. The recess 216 may, in some configurations, correspond to portions of the hole 202 with one or more dimensions that are larger than other portions of the hole 202. In some configurations, portions of the locking member 200 above and/or below (e.g., in a Z-direction) the recess 216 may be substantially aligned with a Z-direction (see, e.g., left side locking member 200 in FIGS. 6B and 6C), and/or other portions may be tapered (see, e.g., right side of locking member 200 in FIGS. 6B and 6C). A taper angle of the tapered portions may, for example and without limitation, be about 20 degrees to about 50 degrees, such as about 35 degrees (e.g., relative to an X-Y plane).

Figure 7:
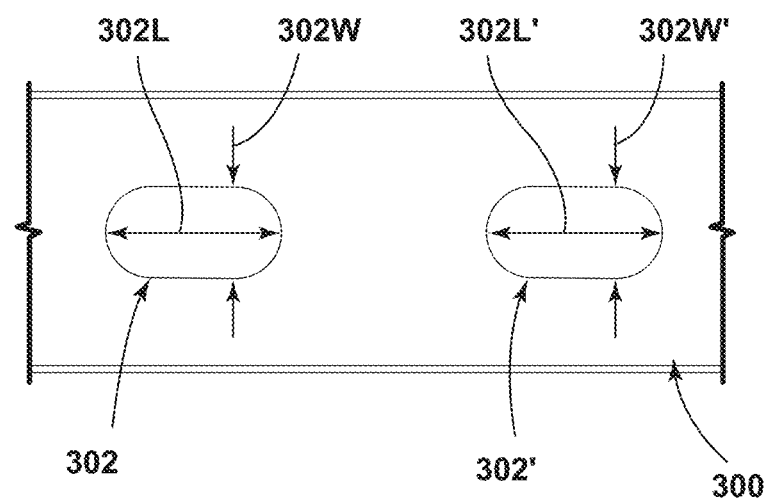
FIG. 7 is a partial top view generally illustrating an embodiment of a flat cable according to teachings of the present disclosure.

In embodiments, such as generally illustrated in FIG. 7, a flat cable 300 may include a plurality of openings, such as a first opening 302, a second opening 302', and/or additional openings. The first opening 302 and/or the second opening 302' may each include a length (e.g., 302L, 302L') correspond to a length 114L of a securing protrusion 114 of the base 110 (see, e.g., FIG. 4). For example, the lengths 302L, 302L' may be equal to or greater than the length 114L. The first opening 302 and/or the second opening 302' may each include a width (e.g., 302W, 302W') that may be equal to or greater than a width 114W of a securing protrusion 114 of the base 110 (see, e.g., FIG. 3). In some configurations, the lengths 302L, 302L' and/or widths 302W, 302W' may be configured to provide at least some degree of an interference fit with a securing protrusion 114. An opening 302, 302' may, for example and without limitation, include a hole having one of a circular, a polygonal (e.g., square, rectangular), or an oblong configuration, among others.

With embodiments, such as generally illustrated in FIG. 2, in an assembled configuration, a portion of a flat cable 300 may be disposed between a platform 112 of a base 110 and a locking member 200, and/or the locking member 200 may be connected (e.g., fixed) to a securing protrusion 114 of the base 110. In some example configurations, a part of the securing protrusion 114 of the base 110 may be disposed within an opening 302 of the flat cable 300 and/or a hole 202 of the locking member 200 such that the securing protrusion 114 is in contact with an internal connection formation 204 of the locking member 200. For instance, the first projections 130, the second projections 132, and/or the third projections 134 of the securing protrusion 114 may engage the internal connection formation 204 such that the locking member 200 is connected to the base 110 and removal of the base 110 from the locking member 200 is restricted and/or prevented. In some example configurations, a fastener 116 of the base 110 may be disposed within a corresponding hole 404 of an external object 400 such that the flat cable 300 is connected to the external object 400 via the cable retainer 100. The cable retainer 100 may comprise metal and/or plastic materials, among others.

Figure 6C:
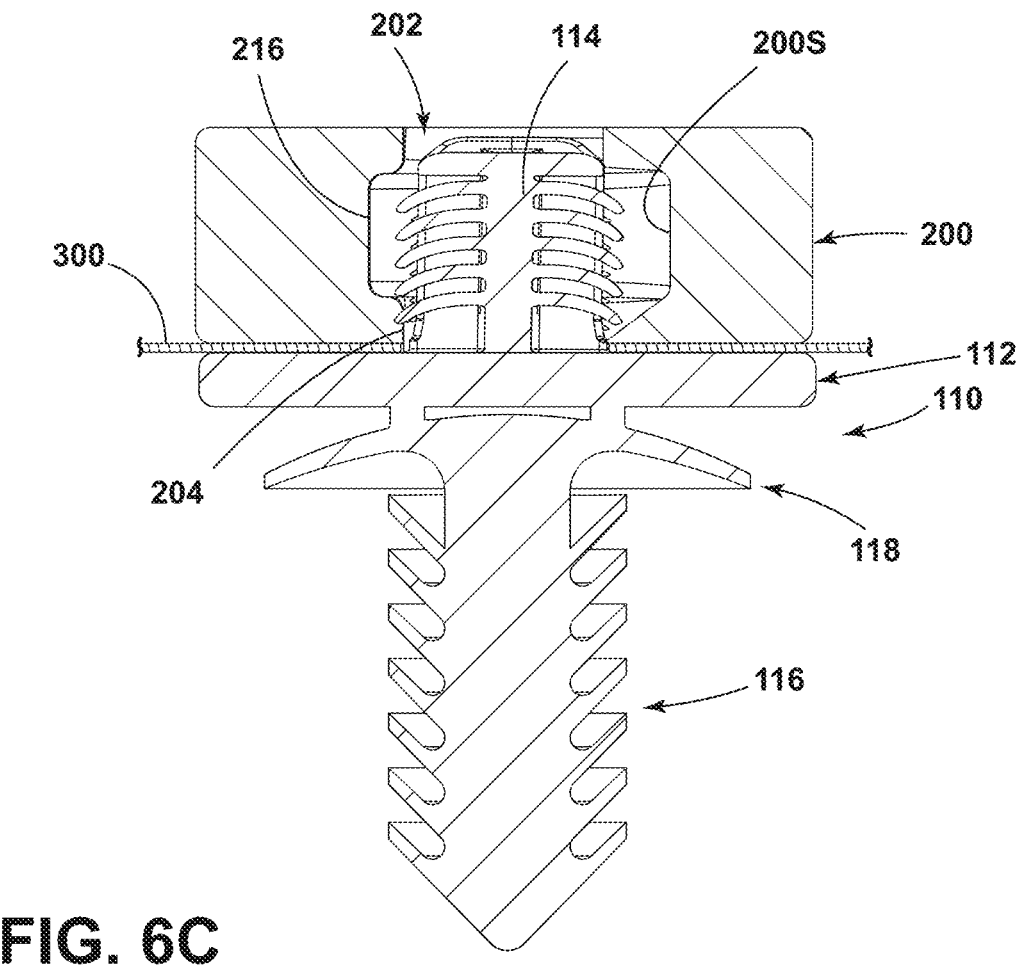
FIG. 6C is a cross-sectional view generally illustrating an embodiment a cable retainer connected to a cable and an external object according to teachings of the present disclosure.

In some embodiments, such as generally illustrated in FIG. 6C, in an assembled configuration, a securing protrusion 114 may extend into a hole 202 of a locking member 200 and may or may not extend beyond the locking member 200 (e.g., in a Z-direction perpendicular to the cable 300).

Figure 8:
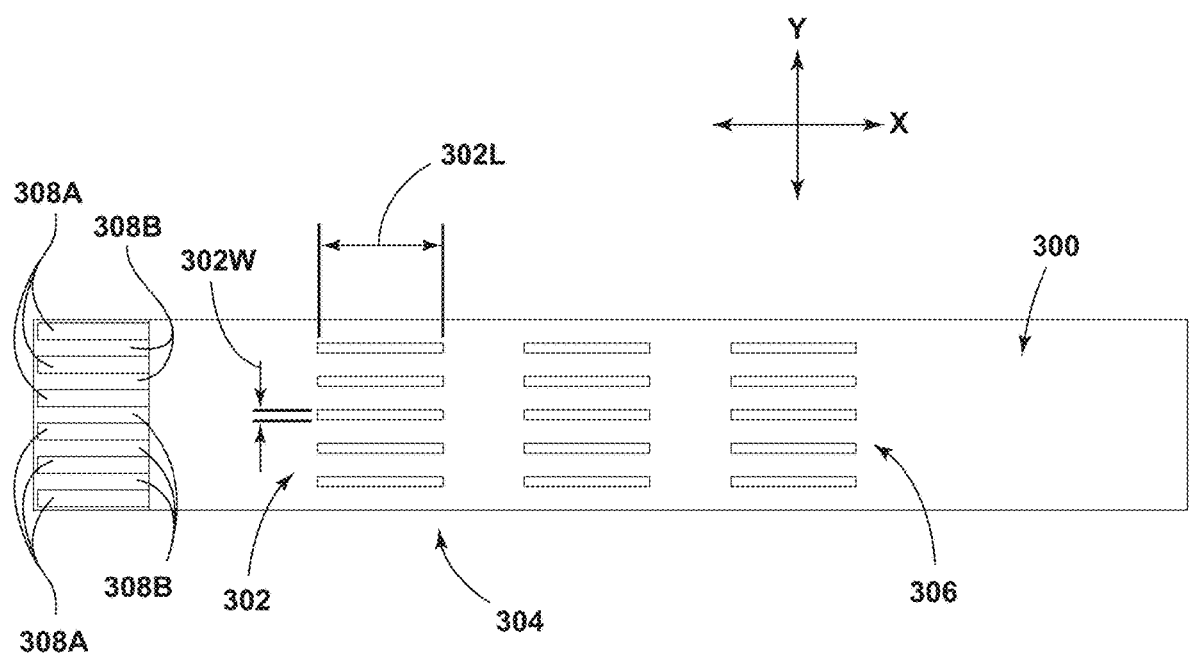
FIG. 8 is a top view generally illustrating an embodiment of a flat cable with ends of conductors exposed according to teachings of the present disclosure.
Figure 9:
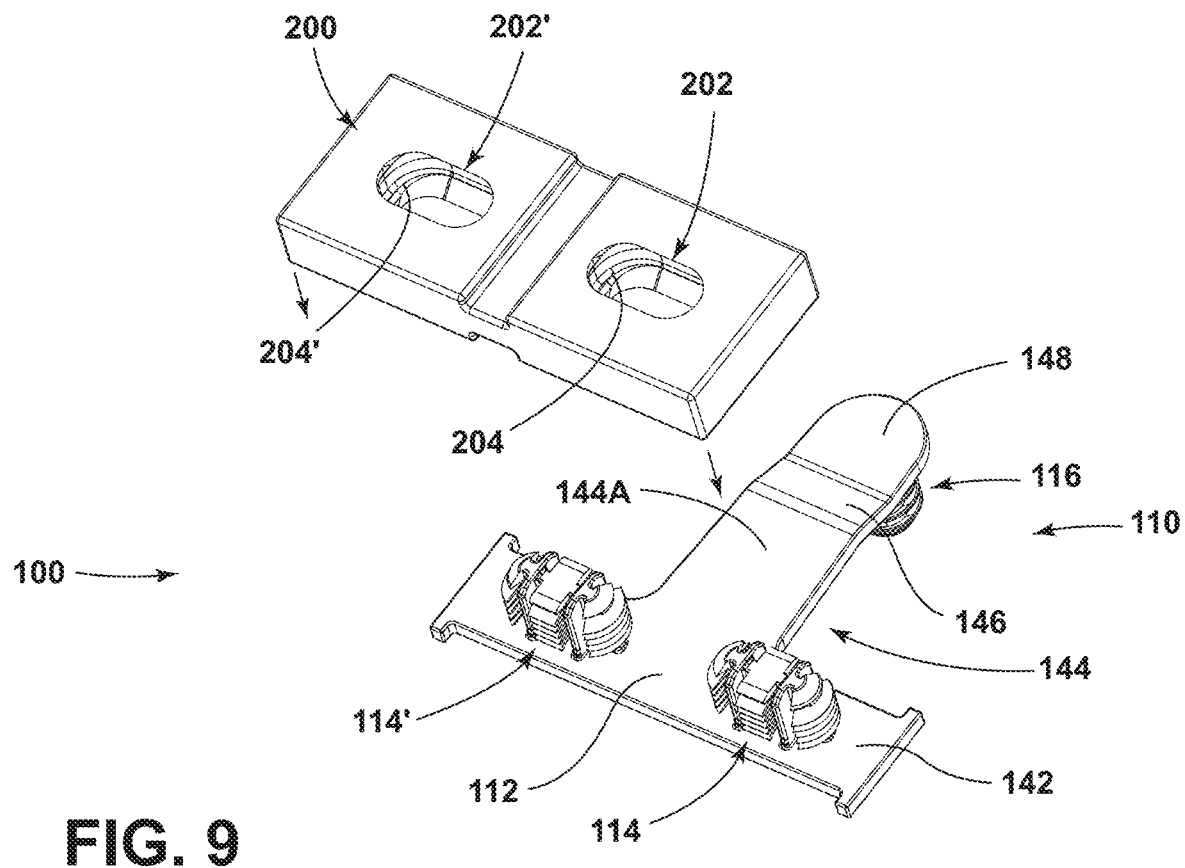
FIG. 9 is an exploded perspective view generally illustrating an embodiment of a cable retainer according to teachings of the present disclosure.

In embodiments, such as generally illustrated in FIG. 8, a flat cable 300 may include an opening 302 or a plurality of openings 302 that may be arranged in a plurality of columns 304 and/or a plurality of rows 306. The openings 302 may, for example and without limitation, include slot configurations, among others. An opening 302 may include a length 302L that is equal to or greater than a length 114L of a securing protrusion 114 and/or a width 302W that is equal to or greater than a width 114W of the securing protrusion 114. The openings 302 may be configured to receive a securing protrusion 114, such as via a clearance fit in one or more dimensions and/or an interference fit in one or more dimensions. The openings 302 may be arranged to accommodate various cable retainer 100 sizes and/or various cable retainer 100 positions.

In embodiments, a flat cable 300 may include one or more electrical conductors 308A and/or insulating material 308B that may electrically insulate the conductors 308A from each other and/or other components. The one or more conductors 308A that may be disposed in parallel with each other and/or that may be substantially aligned with a common plane (e.g., an X-Y plane). The one or more conductors 308A may, in some configurations, be integrally formed with the insulating material 308B. Some or all portions of an opening 302 may be disposed between (e.g., in a Y-direction) two conductors 308A.

In embodiments, such as generally illustrated in FIGS. 9-14, a base 110 of a cable retainer 100 may include a first segment 142 and a second segment 144. The first segment 142 and the second segment 144 may be disposed in a T-shaped configuration. For example, the second segment 144 may extend orthogonally from the first segment 142. The second segment 144 may include a ramp portion 146 and/or an end portion 148. The end portion 148 may be disposed at a distal end of the second segment 144. The ramp portion 146 may be disposed between first segment 142 and the end portion 148. The ramp portion 146 may be disposed such that the end portion 148 is disposed lower than the first segment 142. In some example configurations, a fastener 116 may extend from the end portion 148. A section 144A of the second segment 144 may extend from the first segment 142. The section 144A and the end portion 148 may be substantially planar and/or parallel. The ramp portion 146 may connect and/or be disposed at an oblique or right angle to the section 144A and the end portion 148.

With embodiments, a base 110 may include more than one securing protrusion 114. For instance, the base 110 may include a first securing protrusion 114 and/or a second securing protrusion 114'. In some example configurations, the first and second securing protrusions 114, 114' may extend from and/or may be spaced apart along the first segment 142 of the base 110.

Figure 11:
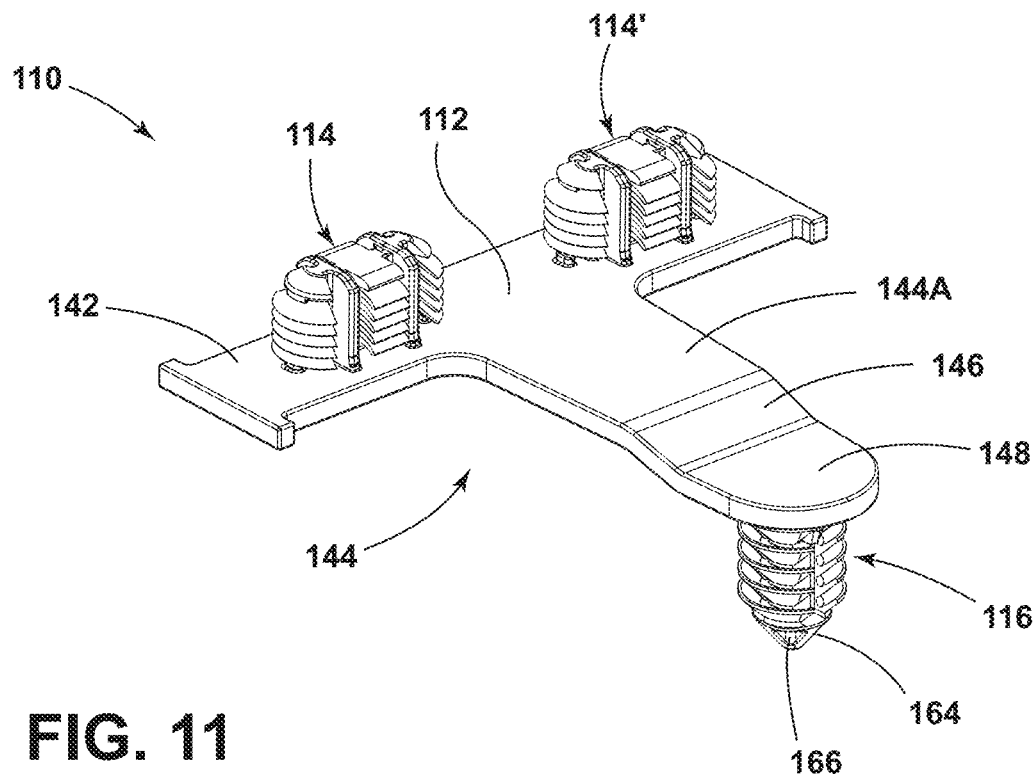
FIGS. 11-14 are perspective, side, bottom, and top views, respectively, generally illustrating an embodiment of a base of a cable retainer according to teachings of the present disclosure.
Figure 12:
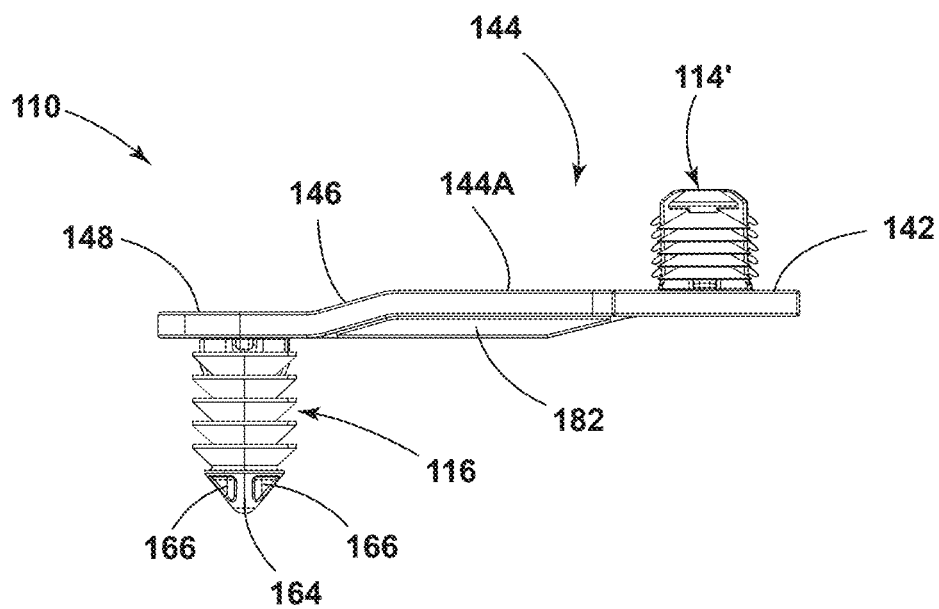

In embodiments, a cone portion 164 of the fastener 116 of the base 110 may include a plurality of voids 166 (see, e.g., FIGS. 11 and 12). The voids 166 may receive corresponding portions of an external object 400 such as to help facilitate the alignment and/or connection of the cable retainer 100 with the external object 400.

Figure 13:
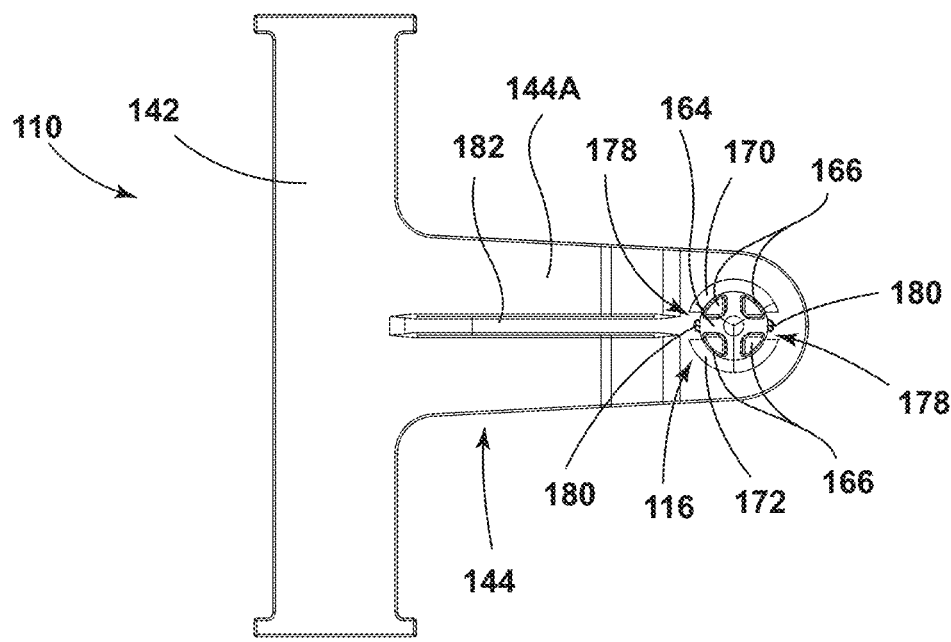
Figure 14:
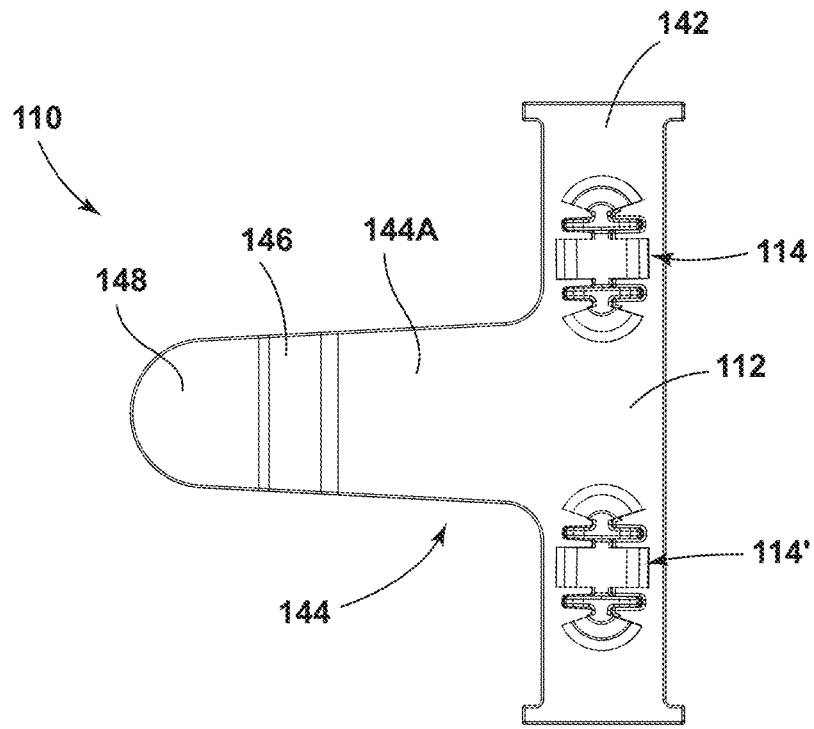

With embodiments, such as generally illustrated in FIGS. 12 and 13, a base 110 may include a reinforcement rib 182. The reinforcement rib 182 may extend along the second segment 144. For instance, the reinforcement rib 182 may extend from proximate the first segment 142 of the base 110 to proximate the fastener 116. The reinforcement rib 182 may be disposed on the same side of base 110 as the fastener 116. In some examples, the reinforcement rib 182 may be configured to add rigidity and/or strength to the cable retainer 100. In some instances, the rib 182 may be configured to operate as an assembly aid such as to help facilitate alignment of the cable retainer 100 with the external object 400. For example, the rib 182 may be received by a corresponding recess of the external object 400.

Figure 15:
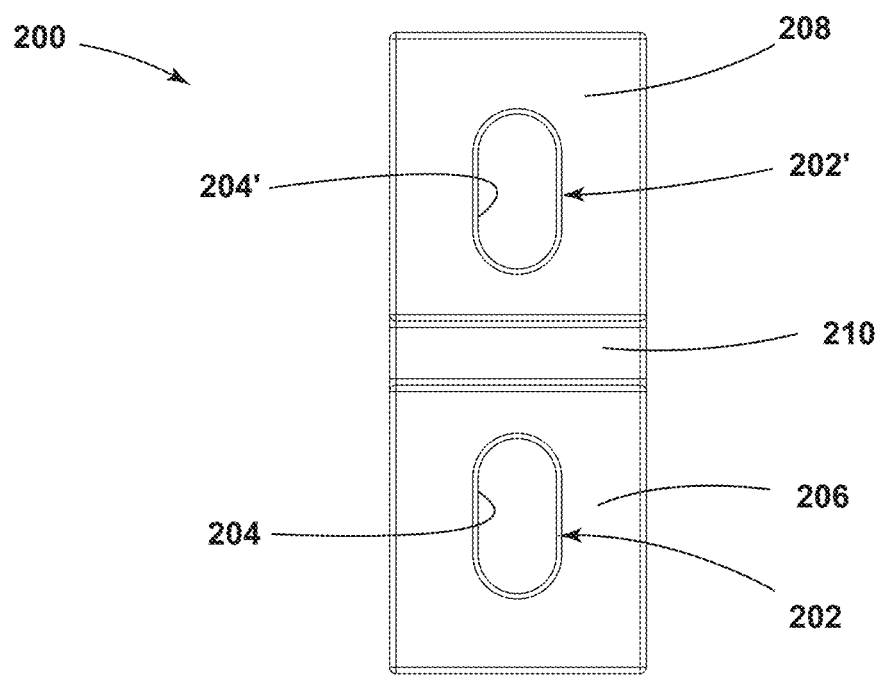
FIG. 15 is a top view generally illustrating an embodiment of a locking member of a cable retainer according to teachings of the present disclosure.
Figure 16:
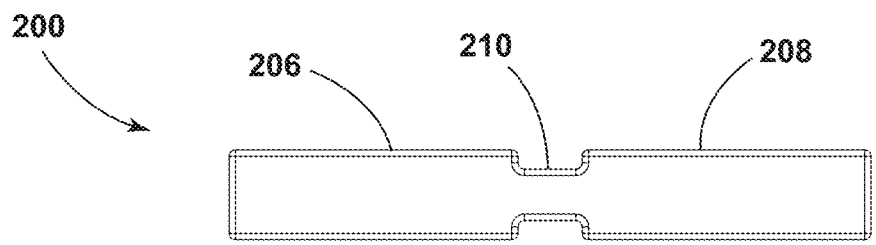
FIG. 16 is a front view generally illustrating an embodiment of a locking member a cable retainer according to teachings of the present disclosure.

In embodiments, such as generally illustrated in FIGS. 15 and 16, a locking member 200 may include a first portion 206, a second portion 208, and/or a web portion 210. The web portion 210 may be disposed between the first portion 206 and the second portion 208. The web portion 210 may connect the first portion 206 and the second portion 208. In some example configurations, the first portion 206 may include a first opening 202 having a first internal connection formation 204, and/or a second portion 208 may include a second opening 202' having a second internal connection formation 204'.

Figure 10:
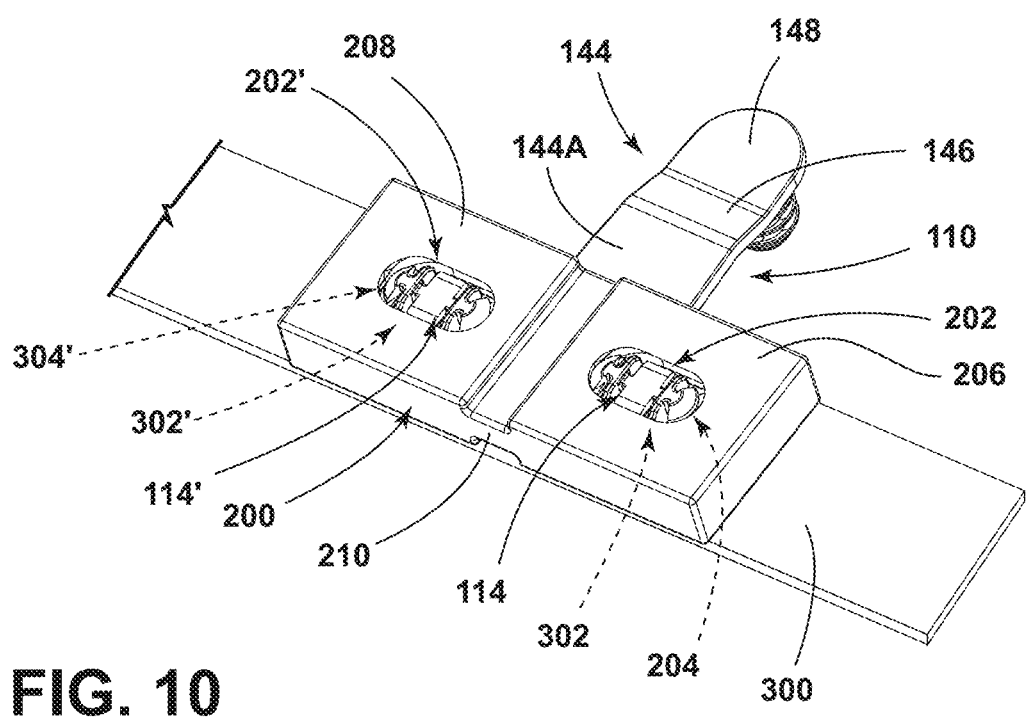
FIG. 10 is a partial perspective view generally illustrating an embodiment of a cable retainer connected to a flat cable according to teachings of the present disclosure.

With embodiments, in an assembled configuration, a portion of flat cable 300 may be disposed between one or more portions of a base 110 and a locking member 200, and/or the locking member 200 may be connected (e.g., secured) to the first and second securing formation 114, 114' of the base 110 (see, e.g., FIG. 10). In some example assembled configurations, the first securing protrusion 114 of the base 110 may be disposed at least partially within a first opening 302 of the flat cable 300 and/or a first hole 202 of the locking member 200 such that the first securing protrusion 114 is in contact with a first internal connection formation 204 of the locking member 200, and/or a part of the second securing protrusion 114' of the base 110 may be disposed in a second opening 302' of the flat cable 300 and/or a second hole 202' of the locking member 200 such that the second securing protrusion 114' is in contact with a second internal connection formation 204' of the locking member 200.

In embodiments, such as generally illustrated in FIGS. 17-22, a locking member 200 may include a first portion 206, a second portion 208, a step portion 212, and/or one or more elevated portions 214, 214'. In some example configurations, the step portion 212 may be disposed between the first portion 206 and the second portion 208. The step portion 212 may include a concave outer surface 212S (see, e.g., FIGS. 17 and 18). The first portion 206 may include a first elevated portion 214, and/or the second portion 208 may include a second elevated portion 214'.

Figure 21:
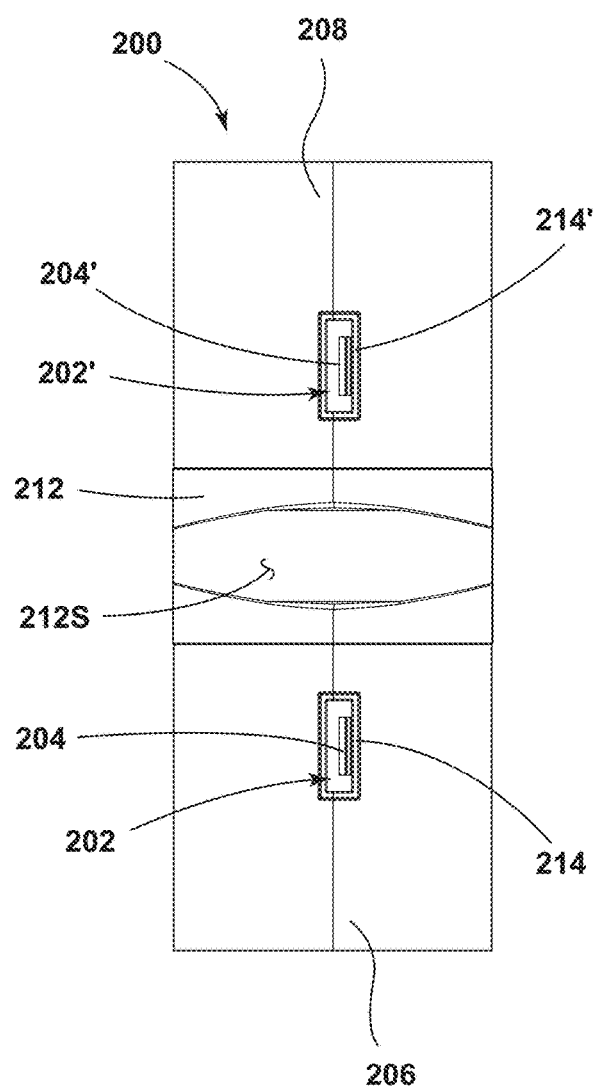
FIG. 21 is a top view generally illustrating an embodiment of a locking member of a cable retainer according to teachings of the present disclosure.
Figure 22:
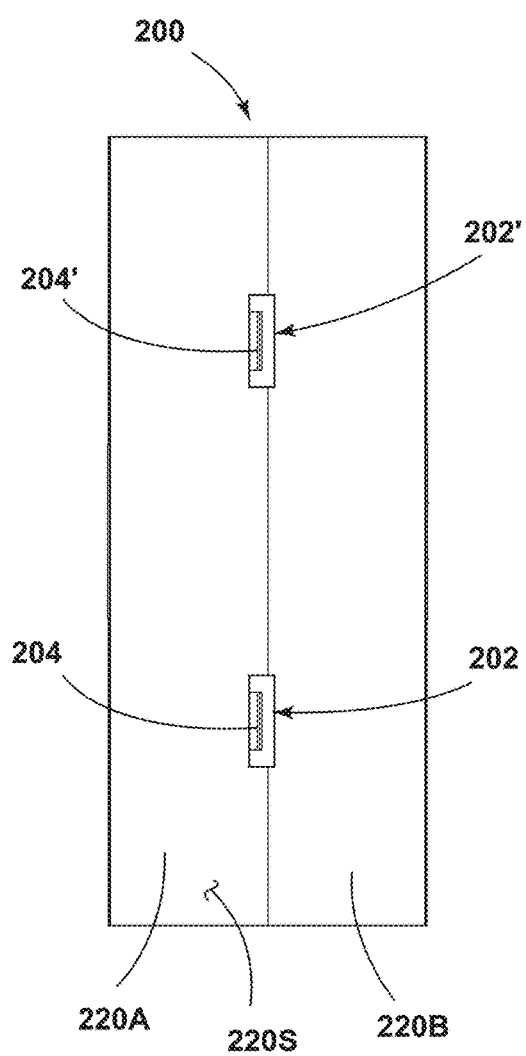
FIG. 22 is a bottom view generally illustrating an embodiment of a locking member of a cable retainer according to teachings of the present disclosure.

With embodiments, such as generally illustrated in FIGS. 21 and 22, a first hole 202 may extend through the first portion 206 and the first elevated portion 214A, and/or a second hole 202' may extend through the second portion 208 and the second elevated portion 214B. A first internal connection formation 204 may be disposed in the first hole 202, and/or a second internal connection formation 204' may be disposed in the second hole 202'.

Figure 17:
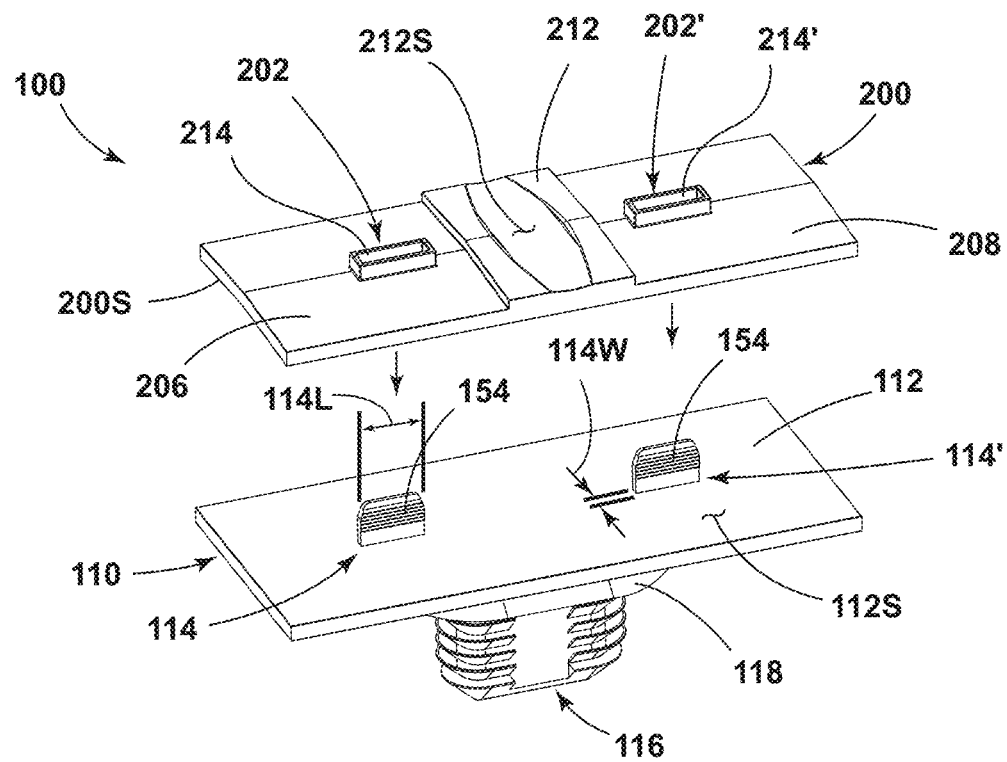
FIG. 17 is an exploded perspective view generally illustrating an embodiment of a cable retainer according to teachings of the present disclosure.
Figure 18:
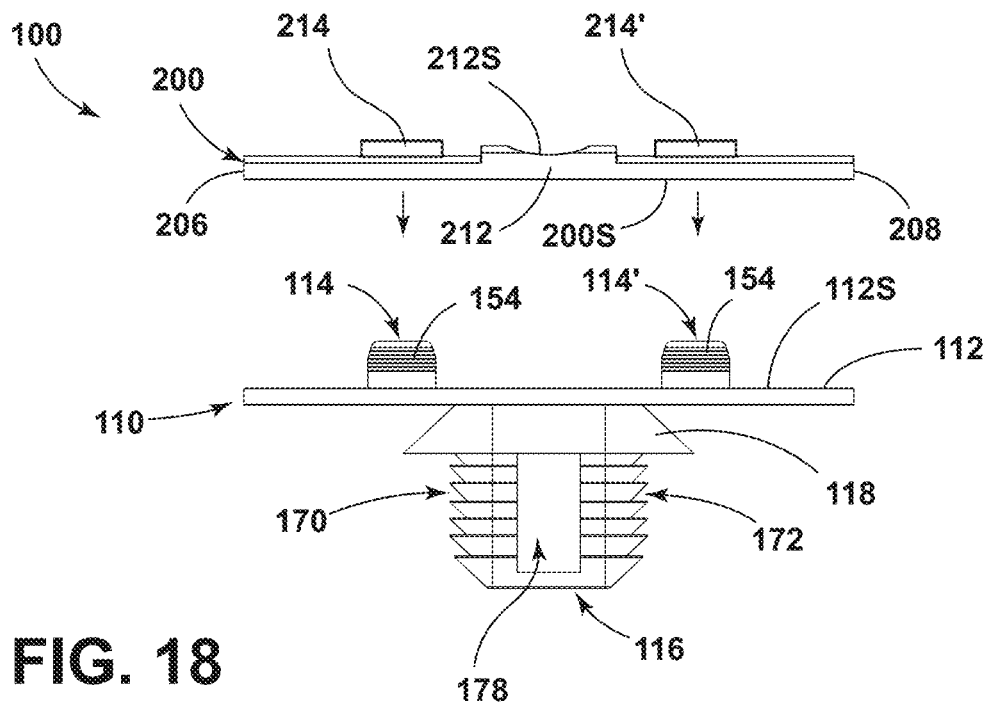
FIG. 18 is an exploded front view generally illustrating an embodiment of a cable retainer according to teachings of the present disclosure.
Figure 19:
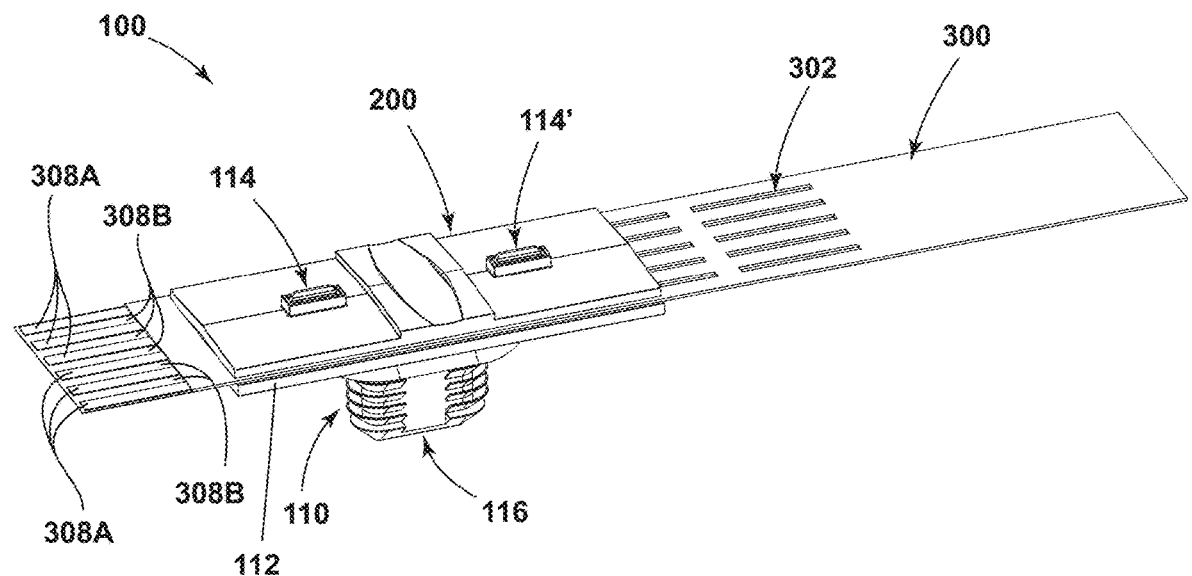
FIG. 19 is a perspective view generally illustrating an embodiment of a cable retainer connected to a flat cable according to teachings of the present disclosure.

In embodiments, such as generally illustrated in FIGS. 17 and 18, a base 110 may include a first securing protrusion 114 and/or a second securing protrusion 114'. In some example configurations, the first and second securing protrusions 114, 114' may include a plurality of serrations 154. The serrations 154 may be configured to engage and/or at least partially receive an internal connection formation 204, 204' of the locking member 200. The serrations 154 may be disposed on at least one side of first and second securing protrusions 114, 114'.

Figure 20:
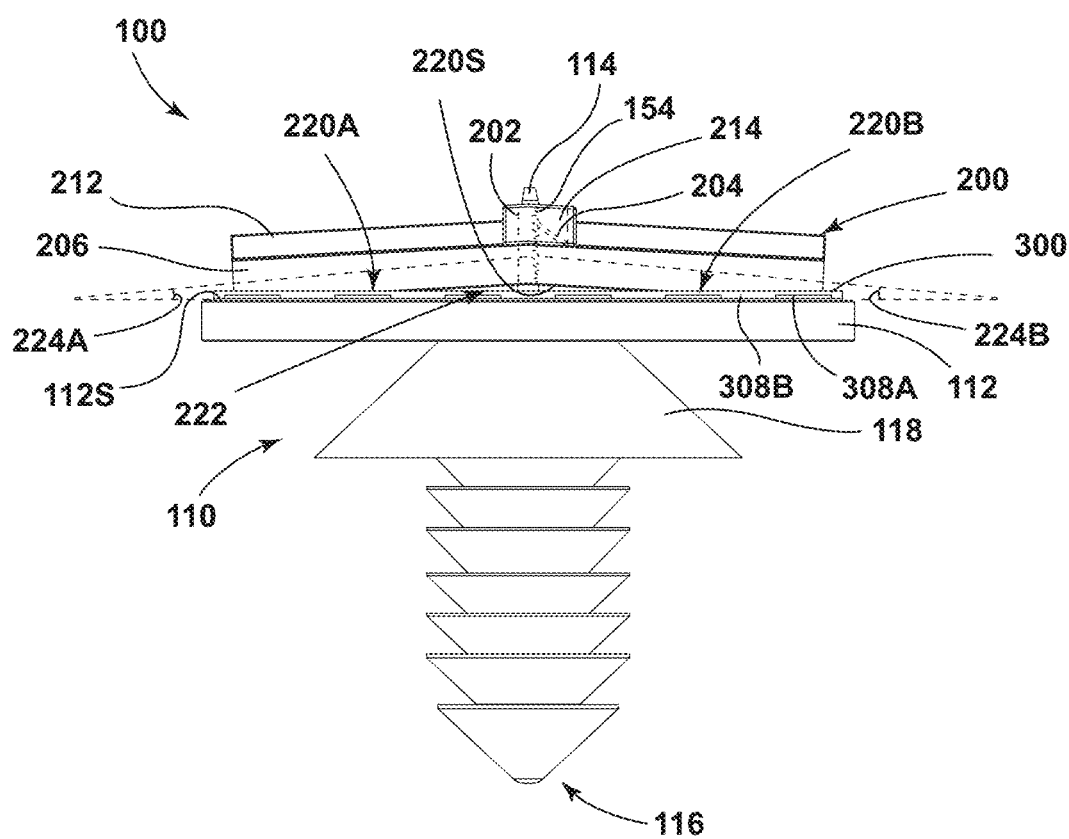
FIG. 20 is a side view generally illustrating an embodiment of a cable retainer connected to a flat cable according to teachings of the present disclosure.

With embodiments, such as generally illustrated in FIG. 22, a surface 220S of a locking member 200 (e.g., a surface that contacts and/or faces the flat cable 300 in an assembled configuration) may include a first section 220A and/or a second section 220B. With embodiments, such as generally illustrated in FIG. 20, in an assembled configuration, the first section 220A and/or the second section 220B may be disposed at angles 224A, 224B (e.g., acute angles) relative to a surface 112S of a platform 112. The angles 224A, 224B may, for example and without limitation, be about 5 degrees to about 25 degrees. With such a configuration, the surface 220S of the locking member 200 may not be disposed entirely flush to the flat cable 300 and/or may not be entirely parallel with the surface 112S of the platform 112, and/or a void 222 may be disposed between a portion of the locking member 200 and the platform 112 of the base 110. Prior to assembly, the angles 224A, 224B may be larger as the assembly process may reduce the angles 224A, 224B. The first and second sections 220A, 220B may be angled to provide a biasing/spring force, which may bias the serrations 154, 154' and the internal connection formation 204, 204' into engagement with each other, such as to reduce play and/or restrict inadvertent disconnection. The internal connection formation 204, 204' may comprise a flexible arm configured to engage the serrations 154, 154'. The flexible arm may flex so as not to materially restrict insertion of a securing protrusion 114, 114' but may engage the serrations 154, 154' to restrict and/or prevent removal of the securing protrusion 114, 114' from the hole 202, 202'.

In embodiments, such as generally illustrated in FIGS. 23-27, a locking member 200 may include a first portion 230, a second portion 232, a first curved portion 234A, and/or a second curved portion 234B. In some example configurations, the second portion 232 may extend orthogonally from the first portion 230. The second portion 232 may include a first side 232A and a second side 232B that may be spaced apart from the first side 232A. The first curved portion 234A may extend from the first side 232A and the first portion 230, and/or the second curved portion 234B may extend from the second side 232B and the first portion 230 (see, e.g., FIG. 27). In some examples, a locking member 200 may include a first internal connection formation 204 and/or a second internal connection formation 204'. The first and second internal connection formations 204, 204' may be disposed within a hole 202 and/or on opposing sides of the hole 202 (see, e.g., FIG. 27).

Figure 24:
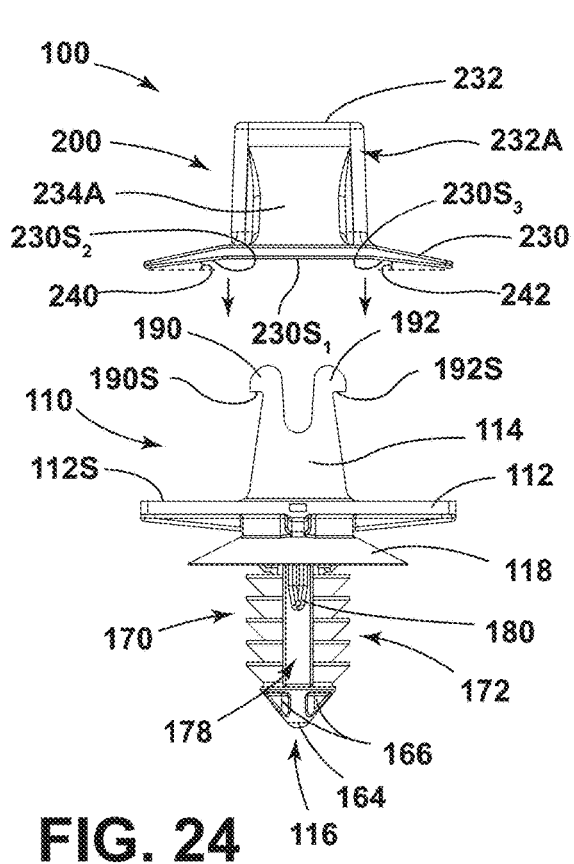
FIG. 24 is an exploded front view generally illustrating an embodiment of a cable retainer according to teachings of the present disclosure.
Figure 25:
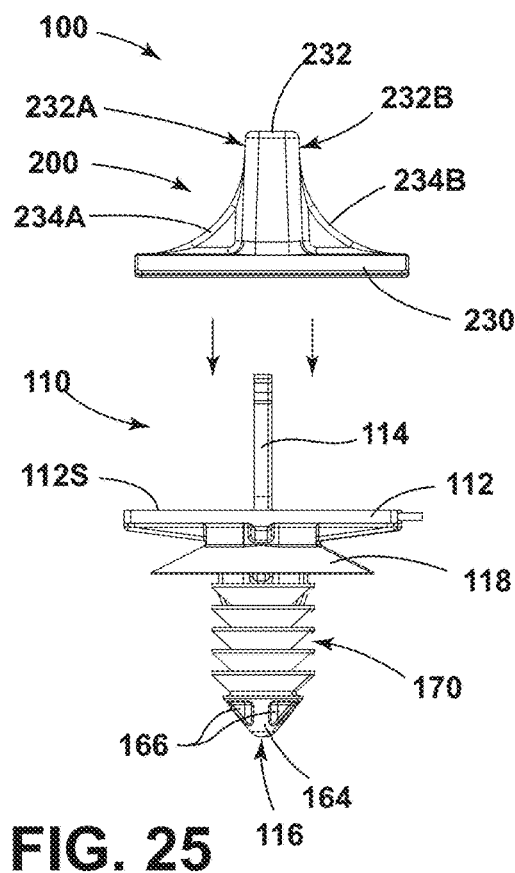
FIG. 25 is an exploded side view generally illustrating an embodiment of a cable retainer according to teachings of the present disclosure.
Figure 26A:
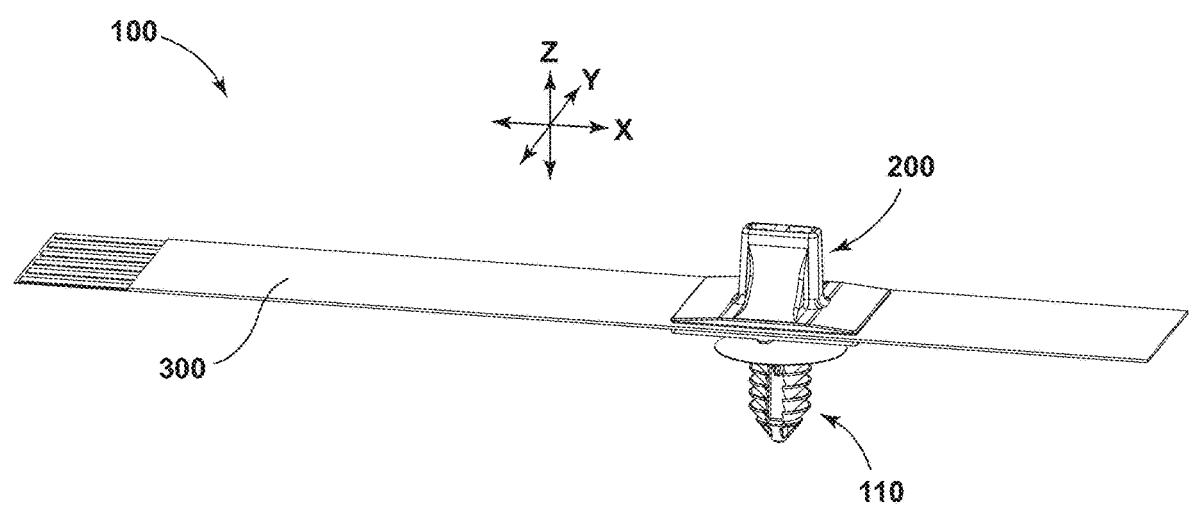
FIG. 26A is a perspective view generally illustrating an embodiment of a cable retainer connected to a flat cable according to teachings of the present disclosure.
Figure 26B:
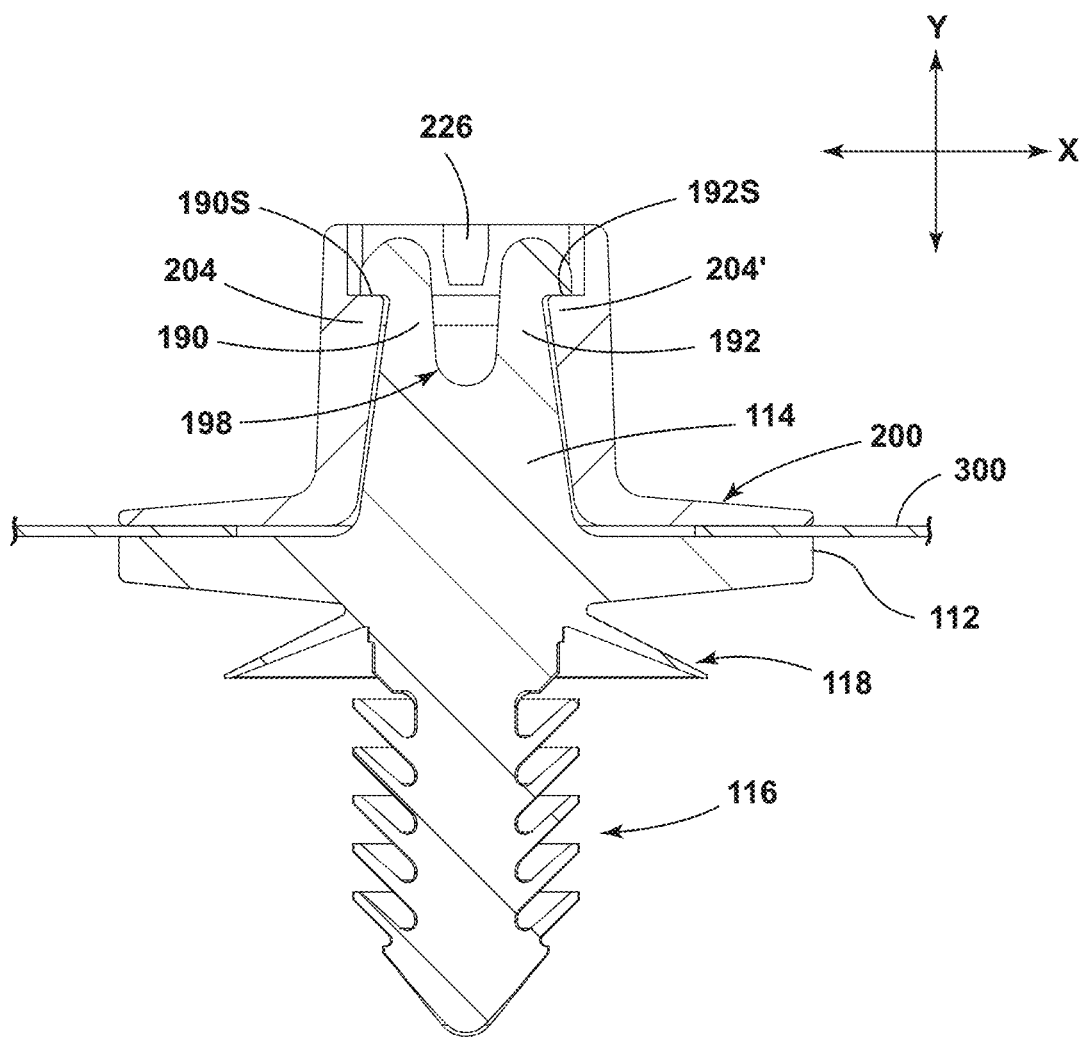
FIG. 26B is a cross-sectional view generally illustrating an embodiment of a cable retainer connected to a flat cable according to teachings of the present disclosure.
Figure 27:
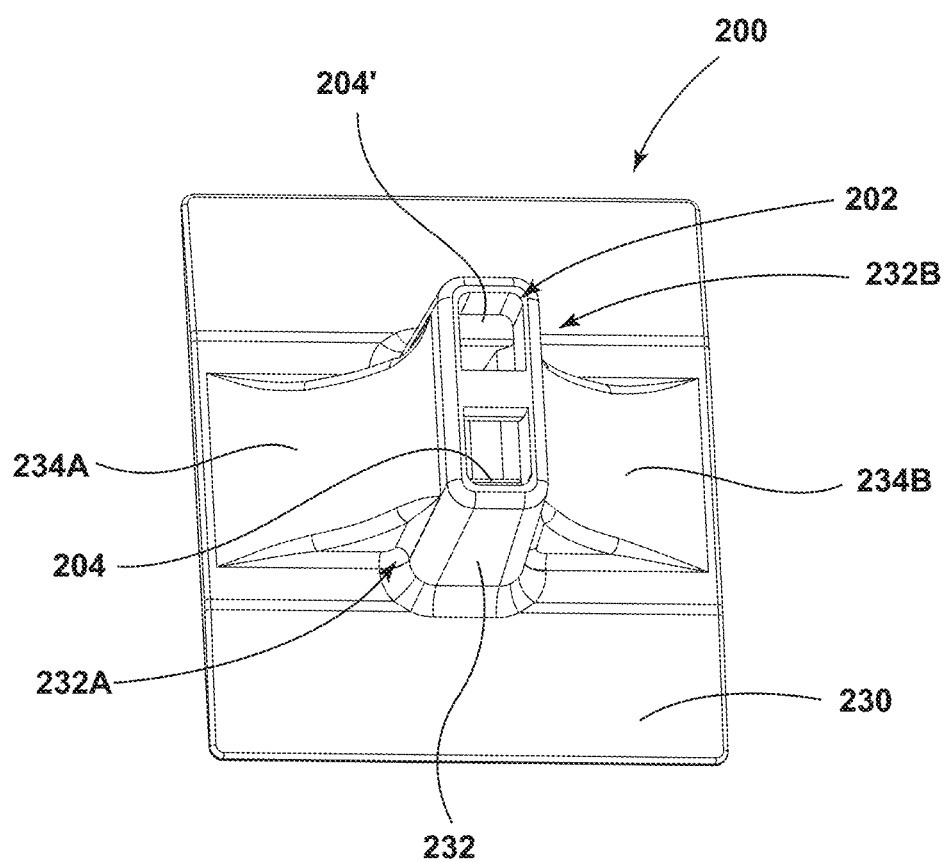
FIG. 27 is a perspective view generally illustrating an embodiment of a locking member of a cable retainer according to teachings of the present disclosure.
Figure 28:
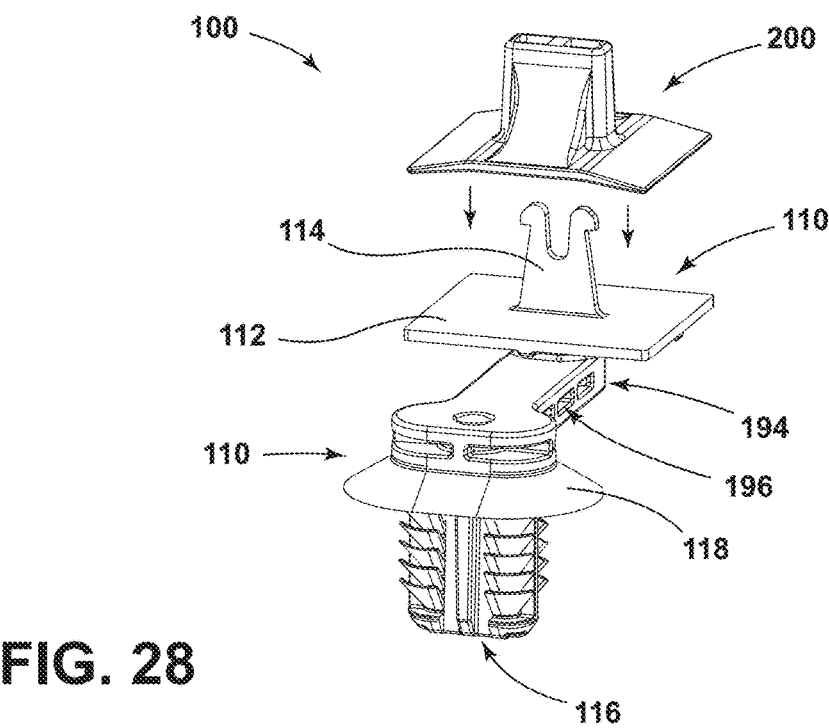
FIG. 28 is an exploded perspective view generally illustrating an embodiment of a cable retainer according to teachings of the present disclosure.
Figures 29, 30:
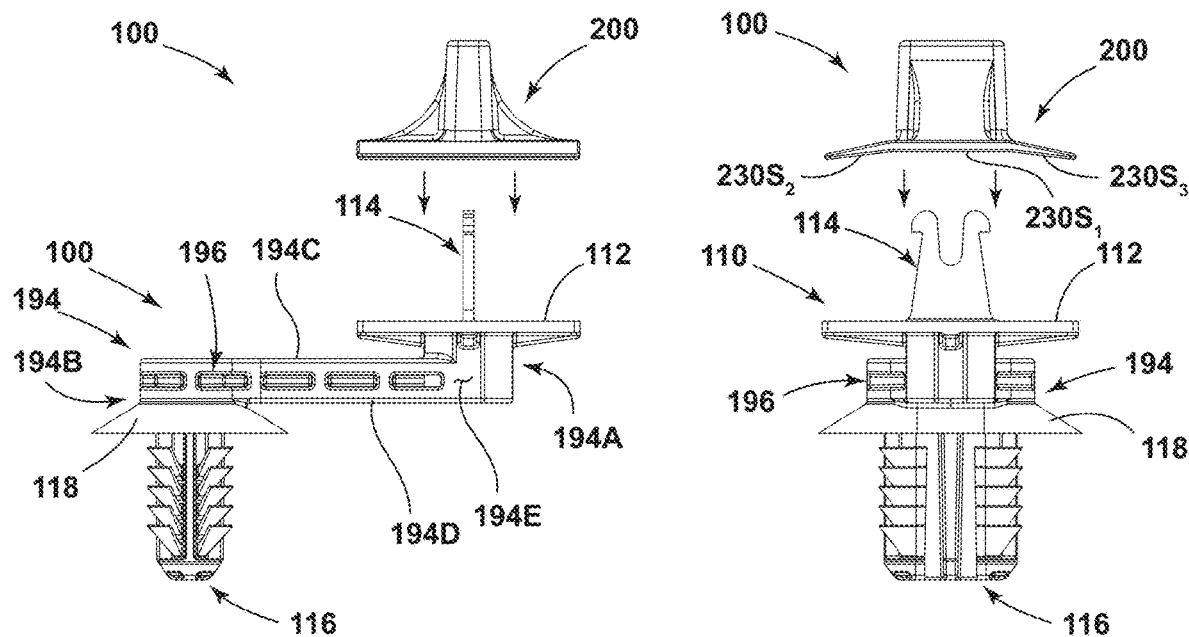
FIG. 29 is an exploded side view generally illustrating an embodiment of a cable retainer according to teachings of the present disclosure.
FIG. 30 is an exploded back view generally illustrating an embodiment of a cable retainer according to teachings of the present disclosure.
Figure 31:
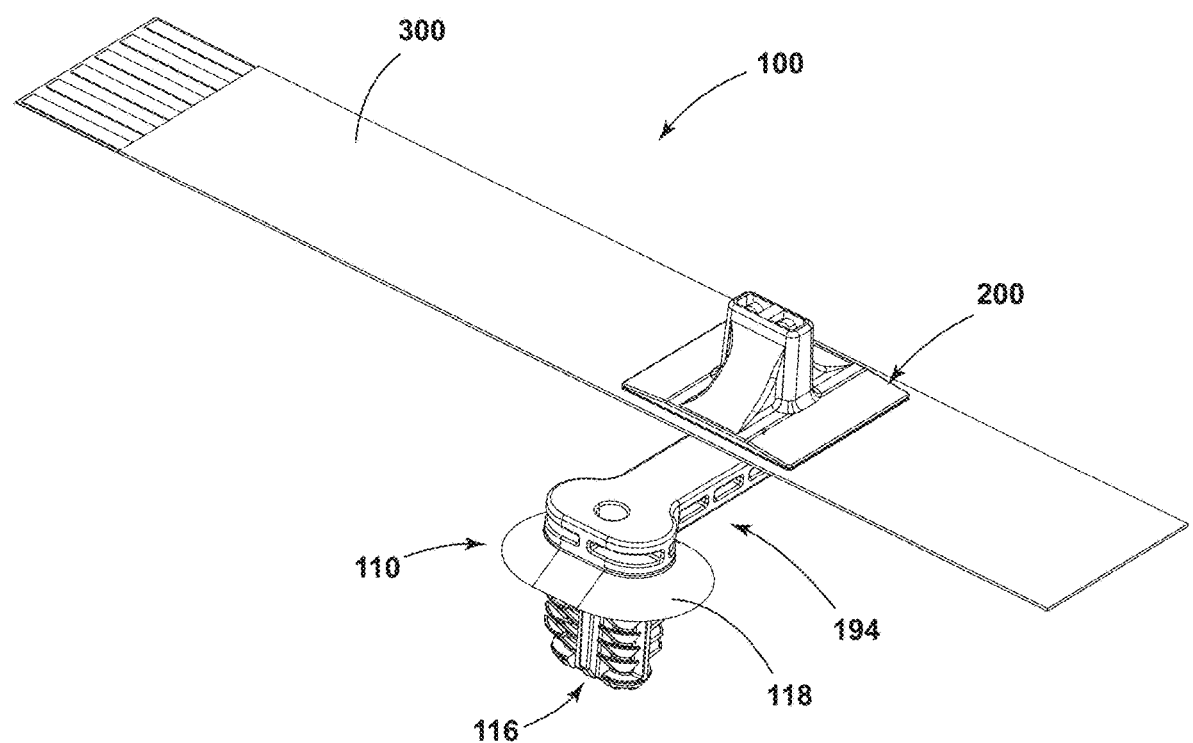
FIG. 31 is a perspective view generally illustrating an embodiment of a cable retainer connected to a flat cable according to teachings of the present disclosure.

With embodiments, such as generally illustrated in FIG. 24, a securing protrusion 114 of a base 110 may include a first portion 190 and/or a second portion 192. For example and without limitation, the first portion 190 and/or the second portion 192 may be disposed in a U-shaped configuration. The first portion 190 may have a first surface 190S and/or the second portion 192 may have a second surface 192S. In an assembled configuration, such as generally illustrated in FIG. 26B, the first surface 190S of the securing protrusion 114 may engage a first internal connection formation 204 of a locking member 200, and/or the second surface 192S may engage a second internal connection formation 204' of the locking member 200 such that the locking member 200 is connected (e.g., retained relative) to the base 110. The securing protrusion 114 may include a void 198 between the first portion 190 and the second portion 192. The locking member 200 may include a cross member 226 that may be aligned with and/or at least partially disposed in the void 198 in an assembled configuration. The cross member 226 may extend across the hole 202, such as in a Y-direction at or about a top of the hole 202.

Figure 23:
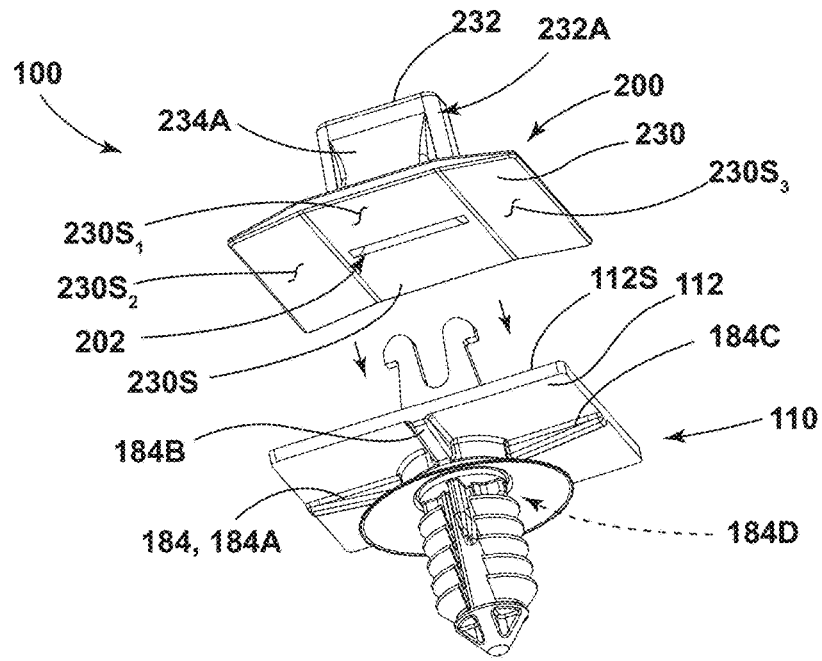
FIG. 23 is an exploded perspective view generally illustrating an embodiment of a cable retainer according to teachings of the present disclosure.

In embodiments, such as generally illustrated in FIG. 23, a base 110 may include a plurality of reinforcement ribs 184 such as a first rib 184A, a second rib 184B, a third rib 184C, and/or a fourth rib 184D. In some examples, the ribs 184 may collectively define a partial cross shape configuration. The ribs 184 may add rigidity and/or strength to a platform 112 of the base 110.

With embodiment, the first portion 230 of the locking member 200 may include a surface 230S having a first section 230S$_1$ disposed between a second section 230S$_2$ and a third section 230S$_3$. Prior to assembly, the second and third sections 230S$_2$, 230S$_3$ may be disposed at angles 240, 242 (e.g., acute angles) relative to the surface 112S (see, e.g., FIG. 24). The angles 240, 242 may, for example and without limitation, be about 5 degrees to about 35 degrees. In an assembled configuration, the surface 230S of the locking member 200 may face a surface 112S of a platform 112 of a base 110, the first section 230S$_1$ may be disposed parallel to surface 112S, and/or angles 240, 242 of the second and third sections 230S$_2$, 230S$_3$ may be smaller than prior to assembly. For example and without limitation, after assembly, the angles 240, 242 may be about 10 degree or less, and, in some instances, may be 0 degrees (e.g., sections 230S$_2$, 230S$_3$ may be substantially parallel with the surface 112S).

In embodiments, such as generally illustrated in FIGS. 28-31, a base 110 may include an extension 194. The extension 194 may have a first end 194A, a second end 194B that may be spaced apart from the first end 194A, a first surface 194C extending between the first end 194A and the second end 194B, a second surface 194D that may be spaced apart from the first surface 194C, and/or a third surface 194E extending between the first surface 194C and the second surface 194D (see, e.g., FIG. 29). In some example configurations, a platform 112 of a base 110 may extend from the first surface 194C of the extension 194 and/or may be disposed proximate the first end 194A of the extension 194. A fastener 116 of the base 110 may extend from the second surface 194D of the extension 194 and/or may be disposed proximate the second end 194B of the extension 194. The extension 194 may, for example and without limitation, include a plurality of voids 196. The voids 196 may be disposed within the third surface 194E. In some examples, the voids 196 may be spaced apart along the third surface 194E.

Figure 32:
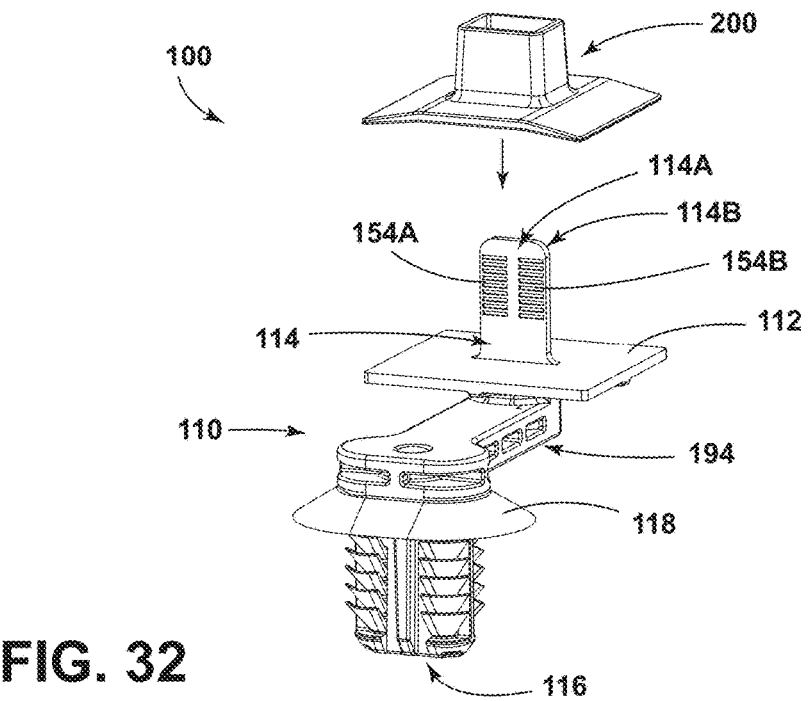
FIG. 32 is an exploded perspective view generally illustrating an embodiment of a cable retainer according to teachings of the present disclosure.
Figure 33:
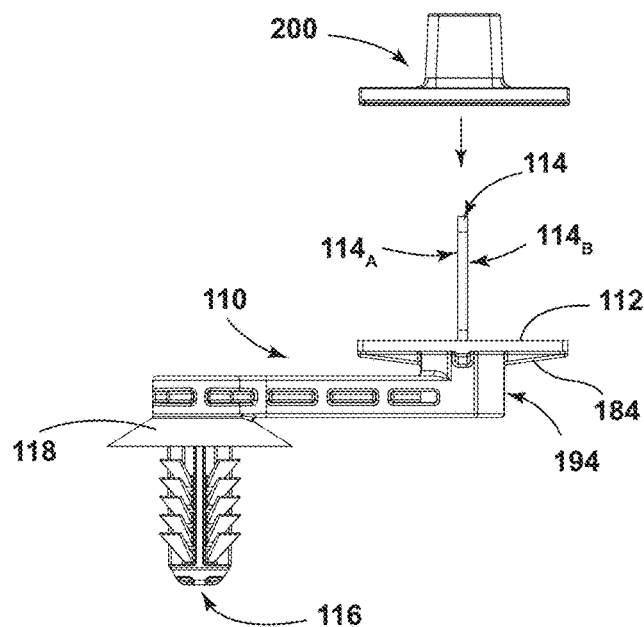
FIG. 33 is an exploded side view generally illustrating an embodiment of a cable retainer according to teachings of the present disclosure.
Figure 34:
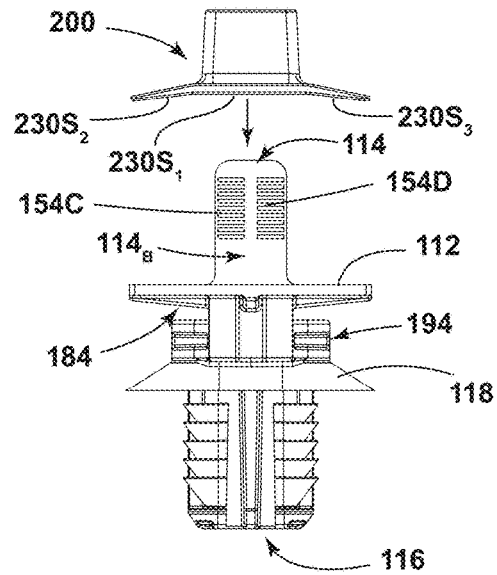
FIG. 34 is an exploded back view generally illustrating an embodiment of a cable retainer according to teachings of the present disclosure.

With embodiments, such as generally illustrated in FIGS. 32-34, a securing protrusion 114 of a base 110 may include a first serrated section 154A, a second serrated section 154B, a third serrated section 154C, and/or a fourth serrated section 154D. In some example configurations, the first and second serrated sections 154A, 154B may be disposed on a first side 114A of the securing protrusion 114, and/or the third and fourth serrated sections 154C, 154D may be disposed on a second side 114B of the securing protrusion 114.

Figure 35A:
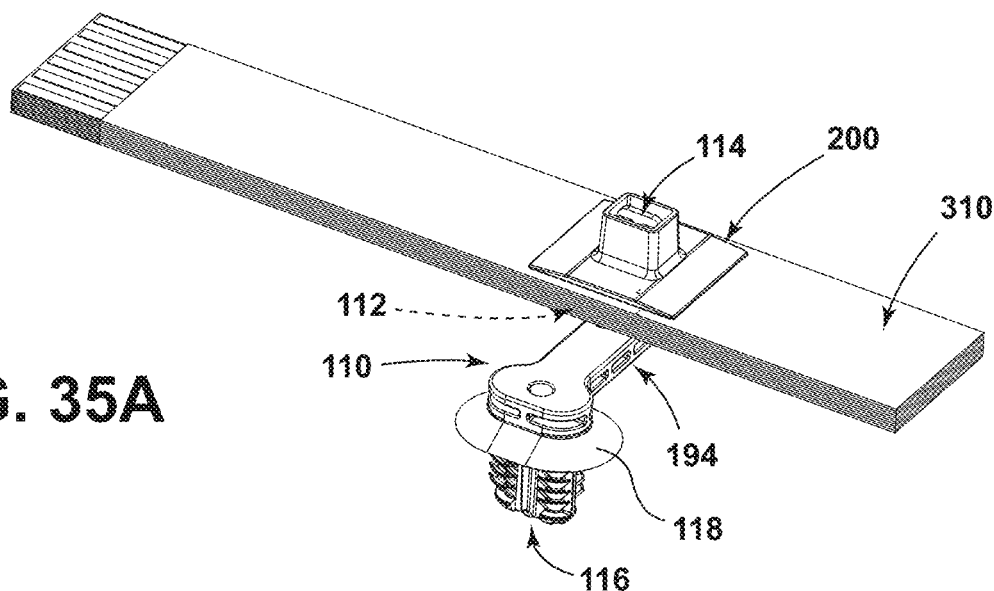
FIG. 35A is a perspective view generally illustrating an embodiment of a cable retainer connected to a plurality of flat cables according to teachings of the present disclosure.
Figure 35B:
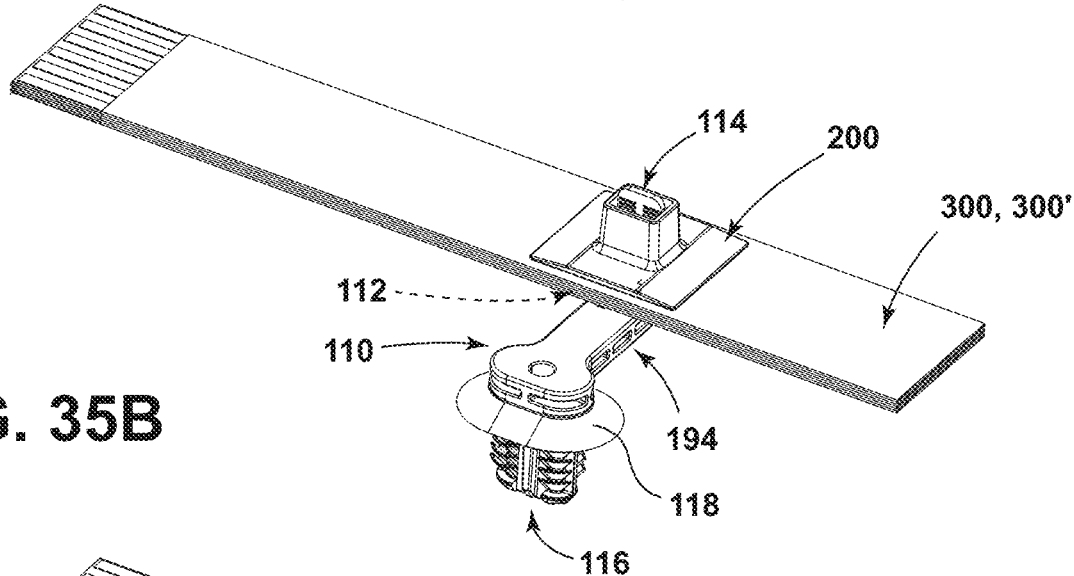
FIG. 35B is a perspective view generally illustrating an embodiment of a cable retainer connected to a plurality of flat cables according to teachings of the present disclosure.
Figure 35C:
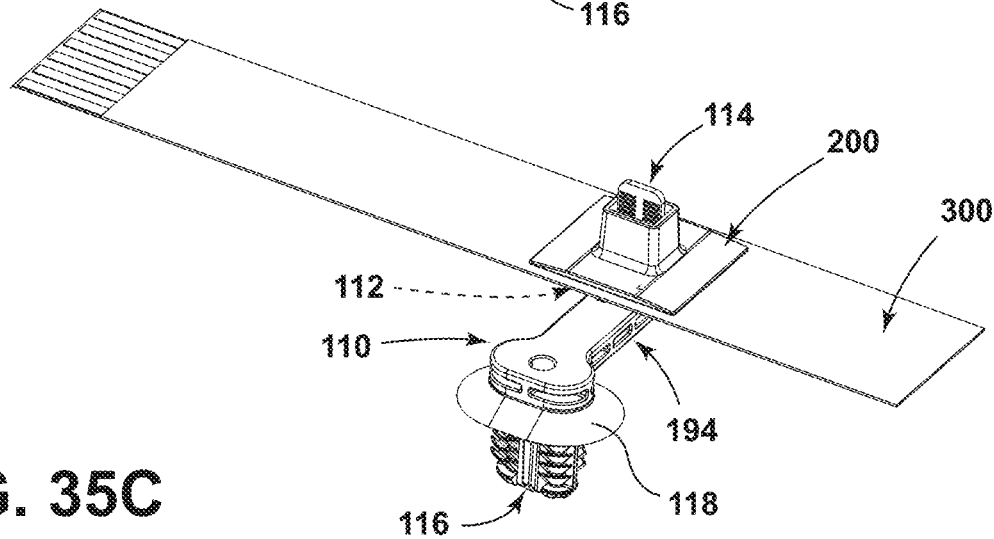
FIG. 35C is a perspective view generally illustrating an embodiment of a cable retainer connected to a flat cable according to teachings of the present disclosure.
Figure 36:
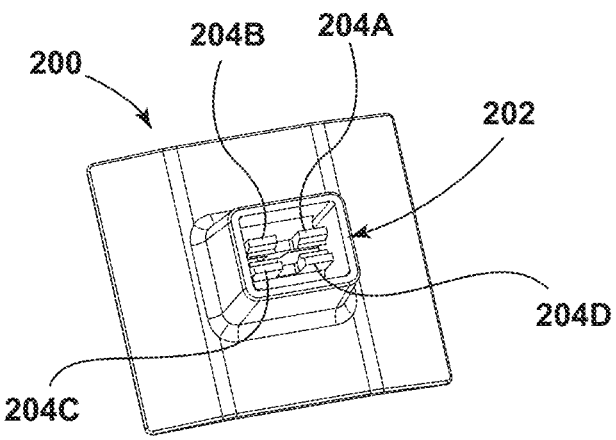
FIG. 36 is a perspective view generally illustrating an embodiment of a locking member of a cable retainer according to teachings of the present disclosure.
Figure 37:
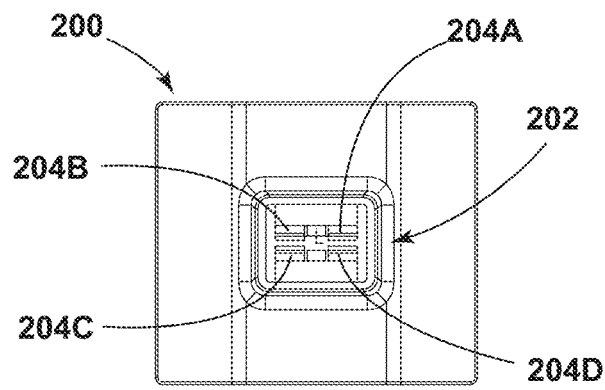
FIG. 37 is a top view generally illustrating an embodiment of a locking member of a cable retainer according to teachings of the present disclosure.
Figure 38:
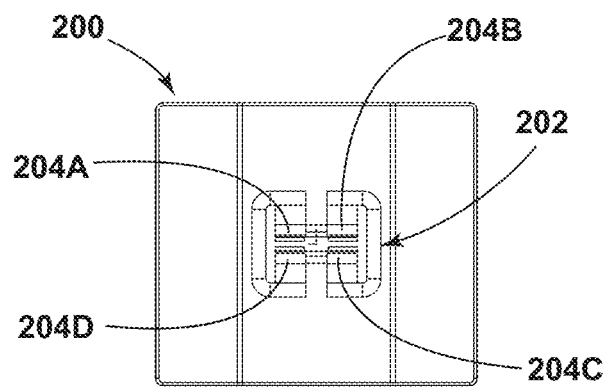
FIG. 38 is a bottom view generally illustrating an embodiment of a locking member of a cable retainer according to teachings of the present disclosure.
Figure 39:
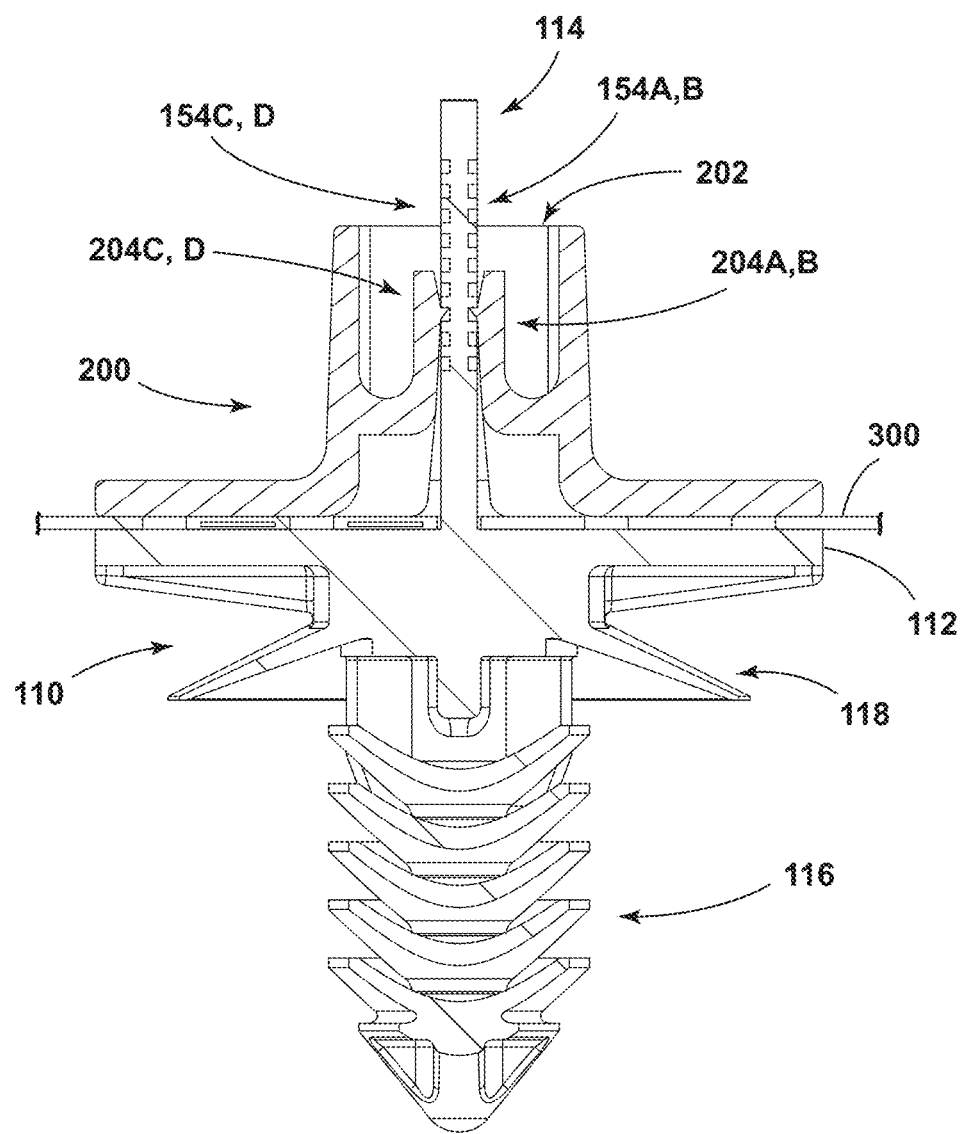
FIG. 39 is a cross-sectional view generally illustrating an embodiment of a locking member of a cable retainer according to teachings of the present disclosure.

With embodiments, such as generally illustrated in FIGS. 35A-35C, a cable retainer 100 may be configured to secure one or more flat cables 300 between a platform 112 of a base 110 and a locking member 200. In some example configurations, the cable retainer 100 may be configured such that a single flat cable 300 is disposed between the platform 112 and the locking member 200 (see, e.g., FIG. 35C). The cable retainer 100 may be configured such that a first flat cable 300 and/or a second flat cable 300' are disposed between the platform 112 and the locking member 200 (see, e.g., FIG. 35B). The cable retainer 100 may be configured such that a plurality of flat cables 310 (e.g., more than two cables 300) are disposed between the platform 112 and the locking member 200 (see, e.g., FIG. 35A).

In embodiments, such as generally illustrated in FIGS. 36-39, an internal connection formation 204 may include a plurality of portions, such as a first portion 204A, a second portion 204B, a third portion 204C, and/or a fourth portion 204D. In an assembled configuration, the first portion 204A may be engaged with the first serrated section 154A, the second portion 204B may be engaged with the second serrated section 154B, a third portion 204C may be engaged with the third serrated section 154C, and/or the fourth portion 204D may be engaged with the fourth serrated section 154D, such that the locking member 200 is connected (e.g., secured) to the base 110. The portions 204A-D may comprise a flexible arm or latch configured to engage the serrations 154A-D. The flexible arm may flex so as not to materially restrict insertion of a securing protrusion 114 but may engage the serrations 154A-D to restrict and/or prevent removal of the securing protrusion 114 from a hole 202.

Figure 40:
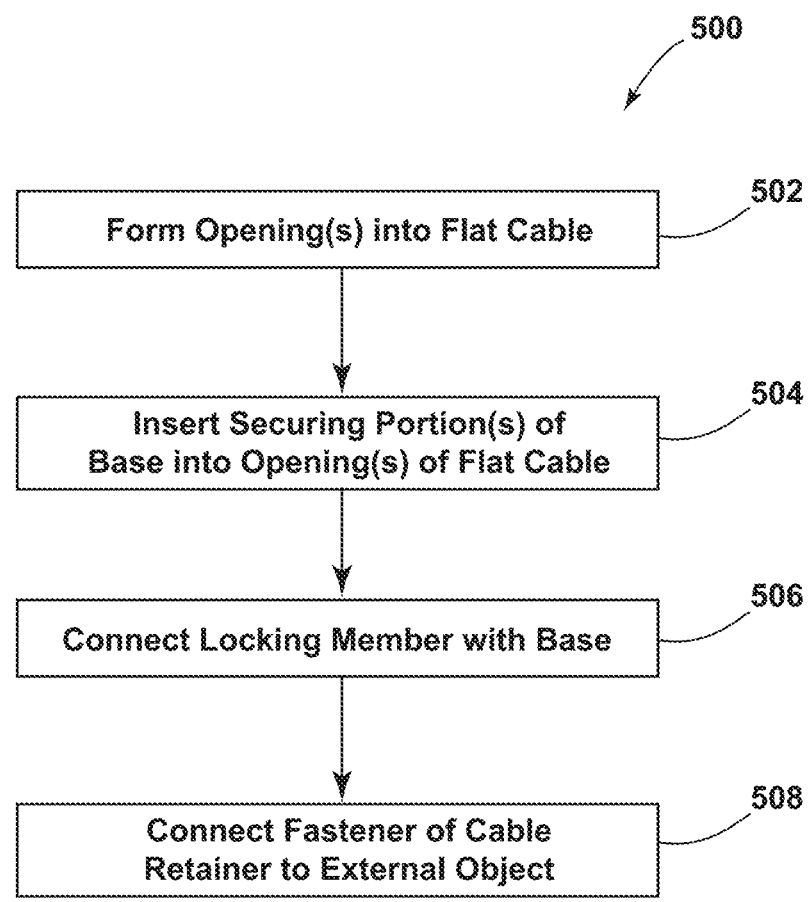
FIG. 40 is a flow diagram generally illustrating an embodiment of a method of connecting a cable retainer according to teachings of the present disclosure.

In embodiments, such as generally illustrated in FIG. 40, a method 500 of connecting/assembling a cable retainer 100 may include forming at least one opening 302 in a flat cable 300 (step 502).

With embodiments, the method 500 may include inserting a securing protrusion 114 of a base 110 into an opening 302 such that a flat cable 300 is disposed on a platform 112 of the base 110 (step 504). In examples including more than one securing protrusions (e.g., 114, 114') the method 500 may include inserting a first securing protrusion 114 into a first opening 302 and/or inserting a second securing protrusion 114' into a second opening 302' such that a flat cable 300 is disposed on the platform 112. In examples including more than one flat cable 300, the method 500 may include forming at least one opening 302 in each of the flat cables 300 and/or inserting a securing protrusion 114 into each of the openings 302 such that the flat cables 300 are disposed (e.g., stacked) on the platform 112 (see, e.g., FIGS. 35A and 35B).

In embodiments, the method 500 may include positioning the locking member 200 such that the locking member 200 is connected (e.g., fixed) to the base 110 (step 506). In some examples, in an assembled configuration, a part of the securing protrusion 114 of the base 110 is disposed within a hole 202 of the locking member 200 and/or the securing protrusion 114 is in contact with the internal connection formation 204 of the locking member 200.

In embodiments, the method 500 may include connecting a fastener 116 of the base 110 to an external object 400 such that a flat cable 300 is connected to the external object 400 via the cable retainer 100 (step 508). In some examples, connecting the fastener 116 to the external object 400 may include inserting at least a portion of the fastener 116 into a corresponding hole 404 of the external object 400 such that the engagement projections of the fastener 116 (e.g., engagement projections 170, 172) engage the external object 400.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A cable retainer for connecting a flat cable to an external object, the cable retainer comprising:
   a base including:
   a platform,
   a securing protrusion extending from a center portion of the platform in a first direction, and a fastener extending from the platform in a second direction, the fastener configured for connection with said external object; and a locking member including a hole disposed substantially in a center portion of the locking member and an internal connection formation, the locking member formed separately from the base and configured to connect with the securing protrusion of the base via a lip of the internal connection formation;

wherein in an assembled configuration, (i) a part of the securing protrusion of the base is disposed within the hole of the locking member and in contact with the internal connection formation of the locking member such that the locking member is connected to the base, and (ii) the cable retainer is configured to secure a portion of said flat cable between the platform of the base and the locking member.

2. The cable retainer of claim 1, wherein the securing protrusion includes:
a first side;
a second side spaced apart from the first side;
a third side disposed between the first and second sides;
a fourth side spaced apart from the third side;
a plurality of first projections that extend from the first side and the second side;
a plurality of second projections that extend from the third side; and
a plurality of third projections that extend from the fourth side.

3. The cable retainer of claim 2, wherein at least one of the first projections includes a substantially rectangular shape and tapered ends; and
at least one of the second projections and the third projections includes a partial conical shape.

4. The cable retainer of claim 2, wherein the securing protrusion includes (i) a first track disposed between the plurality of first projections and the plurality of second projections and (ii) a second track disposed between the plurality of first projections and the plurality of third projections.

5. The cable retainer of claim 2, wherein:
in the assembled configuration, at least one of each of the plurality of first projections, the plurality of second projections, and the plurality of third projections engages the lip.

6. The cable retainer of claim 1, wherein:
the base includes a second securing protrusion;
the locking member includes a second hole; and
in the assembled configuration, the second securing protrusion is disposed at least partially in the second hole.

7. The cable retainer of claim 1, wherein the base includes a conical flange disposed between the platform and the fastener.

8. A method of connecting the cable retainer of claim 1, comprising:
forming an opening in the flat cable, the opening having an opening length that corresponds to a length of the securing protrusion;
inserting the securing protrusion of the base into the opening such that the flat cable is disposed on the platform;
connecting the locking member to the base; and
connecting the fastener to the external object such the flat cable is connected to the external object via the cable retainer.

9. The method of claim 8, including, prior to connecting the locking member to the base, inserting the securing protrusion into a second flat cable;
wherein the fastener is connected to the external object such that the flat cable and the second flat cable are connected to the external object via the cable retainer.

10. A cable retainer for connecting a flat cable to an external object, the cable retainer comprising:
a base including:
a platform,
a securing protrusion extending from a center portion of the platform in a first direction, and
a fastener extending from the platform in a second direction, the fastener configured for connection with said external object;
a locking member including a hole disposed substantially in a center portion of the locking member and an internal connection formation, the locking member formed separately from the base and configured to connect with the securing protrusion of the base; and
the fastener further comprising:
a first end disposed proximate the platform and a second end spaced apart from the first end;
a cone portion including a plurality of voids disposed proximate the second end;
a plurality of first engagement projections disposed between the cone portion and a flange, the flange further disposed between the platform and the fastener, and the first engagement projections extending in a third direction; and
a plurality of second engagement projections that extend in a fourth direction;
wherein in an assembled configuration, (i) a part of the securing protrusion of the base is disposed within the hole of the locking member and in contact with the internal connection formation of the locking member such that the locking member is connected to the base, and (ii) the cable retainer is configured to secure a portion of said flat cable between the platform of the base and the locking member.

11. The cable retainer of claim 10, wherein:
the first engagement projections are separated from the second engagement projections by a void of the plurality of voids that extends from the first end to the second end of the fastener;
the fastener includes an attachment segment that is disposed within the void; and
the attachment segment extends from the first end and terminates before reaching the second end.

12. A cable retainer for connecting a flat cable to an external object, the cable retainer comprising:
a base including:
a platform,
a securing protrusion extending from the platform in a first direction, and
a fastener extending from the platform in a second direction, the fastener configured for connection with said external object;
a locking member including a hole and an internal connection formation, the locking member formed separately from the base and configured to connect with the securing protrusion of the base;
the platform of the base includes a first segment, a second segment that extends orthogonally from the first segment, and a reinforcement rib;
the second segment includes a ramp portion and an end portion;

the end portion is disposed at an end of the second segment;

the fastener extends from the end portion;

the securing protrusion extends from the first segment; and the reinforcement rib extends at least partially along the second segment;

wherein in an assembled configuration, (i) a part of the securing protrusion of the base is disposed within the hole of the locking member and in contact with the internal connection formation of the locking member such that the locking member is connected to the base, and (ii) the cable retainer is configured to secure a portion of said flat cable between the platform of the base and the locking member.

* * * * *